US010991257B2

(12) United States Patent
Mustafic et al.

(10) Patent No.: US 10,991,257 B2
(45) Date of Patent: Apr. 27, 2021

(54) NAVIGATION SYSTEMS AND METHODS FOR DRONES

(71) Applicant: AT&T Mobility II LLC, Atlanta, GA (US)

(72) Inventors: Damir Mustafic, Atlanta, GA (US); Haywood S. Peitzer, Randolph, NJ (US); James A. Wolters, II, Sandy Springs, GA (US); Matthew Walsh, Roswell, GA (US); Thomas Becker, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/403,443

(22) Filed: May 3, 2019

(65) Prior Publication Data

US 2019/0259287 A1 Aug. 22, 2019

Related U.S. Application Data

(63) Continuation of application No. 15/442,550, filed on Feb. 24, 2017, now Pat. No. 10,304,343.

(51) Int. Cl.
*G08G 5/00* (2006.01)
*H04W 48/08* (2009.01)
(Continued)

(52) U.S. Cl.
CPC ......... *G08G 5/0034* (2013.01); *B64C 39/024* (2013.01); *G08G 5/0039* (2013.01);
(Continued)

(58) Field of Classification Search
CPC .. G08G 5/0034; G08G 5/0069; G08G 5/0039; G08G 5/0026; G08G 5/0043;
(Continued)

(56) References Cited

U.S. PATENT DOCUMENTS 7,228,227 B2 6/2007 Speer
8,280,309 B2 * 10/2012 Monk .................. H04W 36/18
455/63.4
(Continued)

FOREIGN PATENT DOCUMENTS

KR 20160082213 7/2016
WO WO 2015/082597 6/2015
(Continued)

OTHER PUBLICATIONS

Hayat et al., "Survey on Unmanned Aerial Vehicle Networks for Civil Applications: A Communications Viewpoint", IEEE, Jan. 2016, 38 pages.
(Continued)

*Primary Examiner* — Dale W Hilgendorf
(74) *Attorney, Agent, or Firm* — Amin, Turocy & Watson, LLP

(57) ABSTRACT

Example methods, apparatus, systems, and articles of manufacture (e.g., physical storage media) to facilitate flight plan implementation, generation, and management are disclosed. An example method includes receiving flight plan information including a flight route and a listing of base stations, connecting to a first base station on the listing, determining a first transition point between the first base station and a second base station on the listing based on the flight route, determining whether the first transition point has been reached, maintaining the connection with the first base station when the first transition point has not been reached, transitioning the connection from the first base station to the second base station when the first transition point has been reached, and/or dropping signals received from base stations not on the listing.

20 Claims, 8 Drawing Sheets

(51) Int. Cl.
| | |
|---|---|
| H04W 36/00 | (2009.01) |
| H04W 48/04 | (2009.01) |
| H04W 36/32 | (2009.01) |
| H04W 36/08 | (2009.01) |
| H04W 36/36 | (2009.01) |
| B64C 39/02 | (2006.01) |
| H04B 7/185 | (2006.01) |
| H04W 36/24 | (2009.01) |

(52) U.S. Cl.
CPC ...... *G08G 5/0069* (2013.01); *H04W 36/0083* (2013.01); *H04W 36/08* (2013.01); *H04W 36/32* (2013.01); *H04W 36/36* (2013.01); *H04W 48/04* (2013.01); *H04W 48/08* (2013.01); *G08G 5/0026* (2013.01); *G08G 5/0043* (2013.01); *G08G 5/0082* (2013.01); *G08G 5/0086* (2013.01); *G08G 5/0091* (2013.01); *H04B 7/18506* (2013.01); *H04W 36/0061* (2013.01); *H04W 36/245* (2013.01)

(58) Field of Classification Search
CPC .. G08G 5/0082; G08G 5/0086; G08G 5/0091; B64C 39/024; H04W 36/32; H04W 36/08; H04W 36/36; H04W 48/04; H04W 36/0083; H04W 48/08; H04W 36/0061; H04W 36/245; H04B 7/18506
See application file for complete search history.

(56) References Cited

U.S. PATENT DOCUMENTS

| | | | |
|---|---|---|---|
| 8,417,444 B2 | 4/2013 | Smid et al. | |
| 9,087,451 B1 | 7/2015 | Jarrell | |
| 9,311,820 B2 | 4/2016 | Batla et al. | |
| 9,359,074 B2 | 6/2016 | Ganesh et al. | |
| 9,384,668 B2 | 7/2016 | Raptopoulos et al. | |
| 9,387,928 B1 | 7/2016 | Gentry et al. | |
| 9,405,296 B2 | 8/2016 | Levien et al. | |
| 9,407,000 B1 | 8/2016 | Willistein | |
| 9,412,279 B2 | 8/2016 | Kantor et al. | |
| 9,454,157 B1 | 9/2016 | Hafeez et al. | |
| 9,456,361 B1 | 9/2016 | Levy et al. | |
| 9,466,218 B2 | 10/2016 | Jarrell | |
| 9,467,922 B1 | 10/2016 | Buchmueller et al. | |
| 9,489,852 B1 | 11/2016 | Chambers et al. | |
| 10,304,343 B2* | 5/2019 | Mustafic et al. | H04W 36/32 |
| 10,389,432 B2* | 8/2019 | DeRosa et al. | G08G 5/0039 |
| 10,558,208 B2* | 2/2020 | Xue et al. | G08G 5/0069 |
| 2010/0330991 A1* | 12/2010 | Sydir et al. | H04W 36/32 455/436 |
| 2014/0018979 A1 | 1/2014 | Goossen et al. | |
| 2015/0142211 A1 | 5/2015 | Shehata et al. | |
| 2016/0027314 A1 | 1/2016 | Stathis | |
| 2016/0070261 A1 | 3/2016 | Heilman et al. | |
| 2016/0088498 A1 | 3/2016 | Sharawi | |
| 2016/0134358 A1 | 5/2016 | Jalali et al. | |
| 2016/0202695 A1 | 7/2016 | Deroos et al. | |
| 2016/0227580 A1* | 8/2016 | Xiong et al. | H04W 48/08 |
| 2016/0232792 A1 | 8/2016 | van Cruyningen | |
| 2016/0253907 A1 | 9/2016 | Taveira | |
| 2016/0266579 A1 | 9/2016 | Chen et al. | |
| 2016/0269917 A1 | 9/2016 | Hillegas, Jr. et al. | |
| 2016/0275801 A1 | 9/2016 | Kopardekar | |
| 2016/0300495 A1 | 10/2016 | Kantor et al. | |
| 2016/0328980 A1 | 11/2016 | Sharma et al. | |
| 2016/0330771 A1 | 11/2016 | Tan | |
| 2016/0342934 A1 | 11/2016 | Michalik | |
| 2017/0012697 A1 | 1/2017 | Gong et al. | |
| 2017/0138480 A1 | 5/2017 | Yu | |
| 2017/0168480 A1* | 6/2017 | Wanstedt et al. | B64C 39/024 |
| 2017/0358225 A1* | 12/2017 | Priest | B64C 36/024 |
| 2018/0005535 A1 | 1/2018 | Kalathil et al. | |
| 2018/0017973 A1 | 1/2018 | Teague | |

FOREIGN PATENT DOCUMENTS

| | | |
|---|---|---|
| WO | WO 2016/053196 | 4/2016 |
| WO | WO 2016/125161 | 8/2016 |
| WO | WO 2016/132295 | 8/2016 |
| WO | WO 2016/137982 | 9/2016 |
| WO | WO 2016/141748 | 9/2016 |

OTHER PUBLICATIONS

Frew et al., "Airborne communication networks for small unmanned aircraft systems", IEEE, Dec. 2008, 23 pages, [online] [Retrieved on Nov. 30, 2016] <URL: http://ieeexplore.ieee.org/ieee_pilot/articles/96jproc12/jprocEFrew2006127/article.html>.

Degrasse, Martha, "Amazon sees cell towers as drone charging stations", RCR Wireless News, Jul. 25, 2016, 5 pages, [online] [Retrieved on Nov. 30, 2016] <URL: http://www.rcrwireless.com/20160725/networkinfrastructure/dronechargingoncelltowerstag4>.

NASA, "First Steps Toward Drone Traffic Management", National Aeronautics and Space Administration, Nov. 19, 2015, 59 pages.

Gharibi et al., "Internet of Drones", IEEE, Feb. 2, 2016, 15 pages.

Qualcomm, "Leading the world to 5G: Evolving cellular technologies for safer drone operation", Qualcomm, Sep. 2016, 31 pages.

Non-Final Office Action received for U.S. Appl. No. 15/442,550 dated Jun. 7, 2018, 38 pages.

Final Office Action received for U.S. Appl. No. 15/442,550 dated Oct. 17, 2018, 35 pages.

\* cited by examiner

NAVIGATION SYSTEMS AND METHODS FOR DRONES

CROSS-REFERENCE TO RELATED APPLICATION

The present application is a continuation of U.S. patent application Ser. No. 15/442,550 filed Feb. 24, 2017 and entitled "Flight Plan Implementation, Generation, and Management for Aerial Devices," which is hereby incorporated by reference in its entirety.

FIELD OF THE DISCLOSURE

This disclosure relates generally to drones and, more particularly, navigation systems and methods for drones.

BACKGROUND

Unmanned aerial vehicles (UAVs), also referred to as drones or unmanned aerial systems (UASs), may be mobile platforms capable of acquiring (e.g., sensing) information, delivering goods, handling objects, and/or performing other actions, in many operating scenarios/applications. UAVs may be utilized to travel to remote locations that are inaccessible to manned vehicles, locations that are dangerous to humans, and/or any other locations more suited for unmanned vehicles than manned vehicles. Upon reaching such locations, drones can perform many actions, such as acquiring sensor data (e.g., audio, image, video, and/or other sensor data) at a target location, delivering goods (e.g., packages, medical supplies, food supplies, engineering materials, etc.) to the target location, handling objects (e.g., retrieving objects, operating equipment, repairing equipment, etc.) at the target location, and so forth. In the various operating scenarios/applications, the actions performed by the UAVs may require navigating the UAVs and maintaining network connectivity, such as connectivity to a cellular network.

SUMMARY

Using various embodiments, flight plans can be implemented, generated, and managed to facilitate aerial navigation of user equipment (UEs) at flight altitude, such as UAVs and/or other aerial devices. A flight plan may include a flight route generated based on a starting point and a destination point and flight rules associated with flying over the flight route. In some aspects, the flight rules may indicate a set of access points of a network to be utilized by a UE during flight over the flight route. The set of access points may be referenced as being preferable. The UE may be provided with information to facilitate access to the access points, such as position and operation parameters (e.g., frequency bands) associated with the access points. In an aspect, the flight rules may indicate how the UE handles events such as link loss and/or inability to establish connectivity to the network (e.g., with access points referenced as being preferable). The UE may drop (e.g., ignore, not scan/listen for) signals from access points not indicated (or not referenced as preferable) in the set of access points. In some cases, to improve reception, the UE may have a directional antenna that can be pointed at different access points en route over the flight route.

Flight plans may be based on geographic information associated with geographic regions that encompass starting points and destination points. The geographic information may include obstacle information, weather information, traffic management information (e.g., air traffic management information), emergency/critical broadcast information, and/or generally any other static and dynamic information associated with the geographic regions. For instance, the air traffic management information may include information associated with present, past, and/or future (e.g., scheduled) flight plans within or in the vicinity of the geographic regions and/or utilization/occupancy of the access points in the geographic region. In some aspects, the flight plan may be generated and managed by a mobile network provider of a network (e.g., cellular network). Adjustments to the flight plans may be made in response to changes in the geographic information and/or in response to requests from the UEs.

Flight plans can be coordinated to allow air traffic to be better distributed throughout the airspace (e.g., to reduce traffic congestion and/or collisions) and/or to allow wireless traffic to be better distributed (e.g., to reduce overloading of some access points and underutilization of other access points), thus facilitating efficient use of the airspace and the network.

Flight plans may allow UEs to maintain cellular connectivity during flight of the UEs over their respective flight routes. With better reception, power dissipation of the UEs may also be reduced, allowing the UEs to travel longer durations/distances before needing to be recharged. In addition, the UEs may conserve power and computational resources by reducing (or avoiding) scanning generally needed to locate access points and by dropping signals from access points not indicated (or not referenced as preferable) in the set of access points.

In one or more embodiments, a method to facilitate aerial navigation of a device includes receiving, by the device, flight plan information including a flight route and a listing of base stations. The method further includes connecting to a first base station on the listing of base stations; determining a first transition point between the first base station and a second base station on the listing of base stations based on the flight route; determining, during flight of the device, whether the first transition point has been reached; maintaining, during flight of the device, the connection with the first base station when the first transition point has not been reached; transitioning, during flight of the device, the connection from the first base station to the second base station when the first transition point has been reached; and/or dropping, during flight of the device, signals received from base stations not on the listing of base stations.

In one or more embodiments, a device includes one or more processors. The device further includes a non-transitory machine readable medium comprising instructions stored therein, which when executed by the one or more processors, cause the one or more processors to perform operations including receiving flight plan information including information indicative of a flight route and a plurality of base stations. The operations further include connecting to a first base station of the plurality of base stations; determining, during flight of the device over the flight route, whether to transition the connection based on at least one of a position of the device along the flight route or signal strengths associated with signals received from the first base station and a second base station of the plurality of base stations; maintaining, during flight of the device over the flight route, the connection with the first base station when the determination is to not transition the connection; transitioning, during flight of the device over the flight route, the connection from the first base station to the second base station when the determination is to transition the connection; and/or dropping, during flight of the device over the flight route, signals received from base stations not among the plurality of base stations.

In one or more embodiments, a tangible machine readable storage medium including machine readable instructions which, when executed, cause one or more processors of a device to perform operations including receiving information associated with a starting point and a destination point, identifying a plurality of base stations associated with a geographic region encompassing the starting point and the destination point, and/or generating flight plan information comprising a flight route and a listing of base stations, where the flight plan information is based at least on the starting point, the destination point, and air traffic information associated with the plurality of base stations. The listing of base stations includes a subset of the plurality of base stations selected based at least on the air traffic information. The operations further include providing for transmission the flight plan information.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 1:
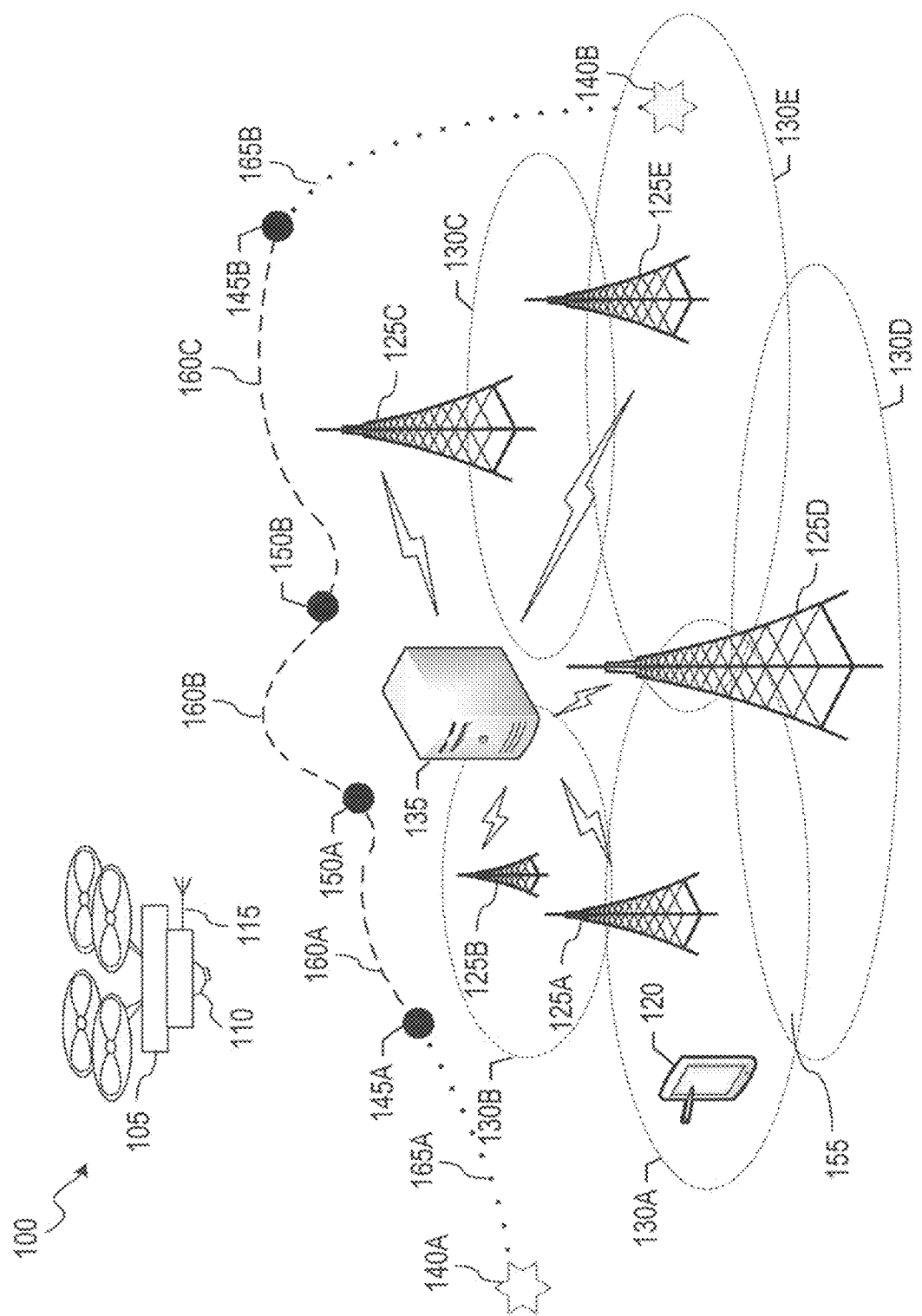
FIG. 1 illustrates an example network environment in which a system for facilitating flight plan implementation, generation, and management may be implemented in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for facilitating flight plan implementation, generation, and management for UEs at flight altitude, such as UAVs and/or other aerial devices. A flight plan may be based on geographic information associated with a geographic region that encompasses a starting point and a destination point, e.g. provided by an operator of a UAV. The geographic information may include obstacle information, weather information, traffic management information (e.g., air traffic management information), emergency/critical broadcast information, and/or generally any other static and dynamic information associated with the geographic region. For instance, the air traffic management information may include information associated with present, past, and/or future (e.g., scheduled) flight plans within or in the vicinity of the geographic region and/or utilization/occupancy of the access points in the geographic region. In some aspects, the flight plan may be generated and managed by a mobile network provider of a network (e.g., cellular network).

Information associated with the flight plan (referred to as flight plan information or simply flight plan) may include, or may have information indicative of (e.g., derivable into), a flight route generated based on the starting point and the destination point and flight rules associated with flying over the flight route. The flight route may be provided as a set of points in three-dimensional space. For example, each point may be associated with a longitude coordinate (or range of longitude coordinates), a latitude coordinate (or range of latitude coordinates), and an altitude coordinate (or range of altitude coordinates). The altitude coordinate may be a distance (e.g., height) from a reference sea level. Similarly, a position of a device (e.g., UE, access points) may be provided in three-dimensional space. In some cases, rather than the longitude, latitude, and/or altitude coordinates, other coordinate systems by which to identify positions of points in a three-dimensional space may be utilized. In this regard, in an aspect, a position may refer to a coordinate value or range of coordinate values in three-dimensional space. In some cases, the flight route may identify potential intermediary stops by the UEs, such as stops at UAV power docking stations to charge the UEs. The UEs may be provided with autonomy as to which (if any) of the potential intermediary stops to use.

In some embodiments, the flight plan information may include flight rules to facilitate implementation (e.g., traversing, realization) of the flight route. The flight rules may identify one or more access points of a network between and/or around the starting point and the destination point for the UEs to connect to while they traverse their flight route. In this regard, the UE may connect to different access points at different portions of the flight route. In an aspect, the access points may be provided to the UEs as a listing of preferred access points. Different flight routes may be associated with a different listing of preferred access points. The UEs may be provided with information to facilitate access to the access points, such as position and operation parameters (e.g., frequency bands) associated with the access points. In an aspect, the access points may be considered/utilized as physical waypoints or lighthouses to facilitate flight over the flight route.

Thus, the flight plan information may be provided to facilitate maintaining of connectivity of UEs with access points of the network during flight of the UEs. For example, with the position information of the access points, the UEs can direct directional antennas towards the access points of the network identified in the flight route based on a current position of the UEs along the flight route. The UEs can ignore signals (e.g., drop signals, not scan/listen for signals) received from access points not identified in the flight plan (or identified as not being preferable in the flight plan). In this regard, the UEs are configured to not connect to access points not identified in the flight plan. Pointing the directional antennas at the access points may allow for better reception of signals (e.g., packets) communicated between the UEs and desired access points (e.g., access points on the listing), while reducing the effect of noise from other access points. In addition, the UEs may conserve power and computational resources by reducing scanning needed to locate access points and by dropping signals from other access points (e.g., with minimal processing).

The flight rules may identify a start time and an end time (e.g., an expected end time) associated with navigating the flight route. In some cases, the end time may take into consideration any intermediary stops expected to be made by the UEs. The flight rules may identify a recommended speed (e.g., recommended average speed) at which the UEs is to fly over the flight route.

In some aspects, the flight rules may be utilized to identify and address situations that may cause the UEs to deviate from their flight routes, connect to access points not on the listing of access points (e.g., connect to access points not referenced as preferable), and/or other situations. For example, the flight rules may indicate how the UEs are to handle connection-based events such as link loss and/or inability to connect to the access points on the listing of access points (e.g., receive signal levels at a certain threshold or level from these access points). The link loss may be a loss in connection between the UE and an access point on the listing or a loss in connection between the UE and an access point not on the listing.

In either connection-based event, the flight rules may indicate that, to potentially improve reception of signals from at least one access point (e.g., on the listing or not on the listing), the UE may position itself such that it is at least a certain distance away from obstructions and/or position itself at an altitude or within a range of altitudes (e.g., within constraints of any regulations), e.g. even in cases that such positioning causes the UE to deviate from the flight route and/or other flight rules. In some cases, the UE may utilize onboard sensors and any available geographic information to facilitate safely implementing such positioning.

The flight rules may indicate that the UE may point its directional antenna to access points provided to the UE in the flight plan information and/or switch to an omnidirectional antenna (if available) to facilitate scanning for access points. In this regard, the flight plan information may provide the UE with the positions of access points referenced as being preferable as well as access points not referenced as being preferable. In some cases, each access point may be associated with a priority level (e.g., provided in the flight plan information), such that access points referenced as being preferable are associated with a higher priority level(s) and access points not referenced as being preferable are associated with a lower priority level(s). The flight rules may indicate that the UE point to access points in an order based on, for example, distance between the UE and the access points, priority level of the access points, geographic information (e.g., obstacle, weather, air traffic, emergency broadcast) between and around the UE and the access points, and/or other factors. In some cases, the flight rules may provide the order to the UE. The flight rules may indicate that the UE may connect to an access point from which signals are received at a certain threshold or level to establish and maintain connection, e.g. a first access point from which the UE is able to receive signals at a certain threshold or level.

In some cases, the flight plan may be adjusted, such as during flight of the UEs over their flight routes, and the UEs may effectuate the adjusted flight plan. The flight plan may be adjusted based on information provided by the UE and/or an operator(s) of the UEs. For example, the operator of a UE may adjust the destination point of the UE. The flight plan may be adjusted based on changes in geographic information associated with the geographic region that encompasses the starting point and the destination point. For example, the flight plan may be adjusted in response to a newly defined obstacle (e.g., newly defined no-fly zone) or a previously unknown obstacle. In an aspect, an operator may refer to any person or persons that may request a flight plan to be utilized for facilitating flight of a UE.

The flight route and flight rules are generated and adjusted in compliance with Federal Aviation Administration (FAA) requirements and/or other requirements, such as temporary flight restrictions (e.g., temporary event such as wildfire or security-related event, stadiums/sporting events), restricted airspace, airport-related restrictions, local flight ordinances, and/or other restrictions. Other flight recommendations and/or requirements may be taken into consideration, such as any recommended or required minimum/maximum flight altitude and/or minimum/maximum flight speed.

Thus, in various embodiments, the techniques facilitate sharing of airspace by UEs through the use of flight plans provided to the UEs. The flight plans can be coordinated to reduce the possibility of collisions (e.g., between different UEs or between a UE and an obstacle), maintain wireless connection of the UEs to a network during flight of the UEs, and/or meet quality of service (QoS) parameters for various applications. For example, QoS parameters for delivering packages may include reliability in meeting a deadline (e.g., time at which to reach the destination point) and/or maintaining the packages in good condition. In this regard, the flight plans can be coordinated to allow air traffic to be better distributed throughout the airspace (e.g., to reduce traffic congestion and/or collisions) and/or to allow wireless traffic to be better distributed (e.g., to reduce overloading of some base stations and underutilization of other base stations), thus facilitating efficient use of the airspace and the network. By defining flight routes, preferred access points for the flight routes, start and/or end times of the flight routes, and/or other parameters associated with facilitating flight from a starting point to a destination point, a large density of UEs may simultaneously share (e.g., fly in) the airspace.

The implementation of the flight plans may be supplemented by onboard sensors of the UEs and/or broadcast messages provided by access points of the network. For instance, the onboard sensors of the UEs may be operated to maintain a minimum distance separation between the UEs and other UEs, and/or between the UEs and obstacles, e.g. such as minimum distance separation requirements or recommendations from FAA.

The network may include a wide area network (WAN), such as a cellular-based WAN. In an aspect, in the case of a cellular network, the listing of access points may be a listing of base stations of the cellular network to which a UE may connect en route to its destination point. In some aspects, base stations of a cellular network are generally those base stations utilized with UEs at ground level or near ground level, such as vehicles (e.g., cars) and mobile phones operated at or near ground level. For example, position and orientation (e.g., tilt) of antennas of the base stations may be configured to provide higher signal strength for devices below these antennas. In this regard, the base stations may be designed with a main antenna pattern that primarily encompasses a ground region. Furthermore, at lower altitudes, obstructions such as buildings and trees may help prevent signals from multiple base stations from reaching the vehicles and devices at or near ground level with signal strengths that cause significant interference.

When radio modules, such as 3G, 4G, 4G Long Term Evolution (LTE), 5G, other $3^{rd}$ Generation Partnership Project (3GPP)-based radio modules, and/or other radio modules, are placed at flight altitude, such as 400 feet or 500 feet, the line of sight propagation of signals from multiple base stations may be received by the radio modules and cause interference. The different antenna patterns (e.g., different vertical antenna patterns) of the base stations at different radio frequencies (e.g., in different frequency bands) and/or at different altitudes may cause degradation of communicated signals, including signals associated with application data and command/control functions. In addition, higher altitudes generally have fewer obstructions than at ground level, and thus more signals may reach the devices/vehicles at higher altitudes and cause interference relative to devices/vehicles at ground level.

In some aspects, although the UEs are not communicating with base stations dedicated to aerial communication, the generation, management, and implementation of the flight plans may facilitate flight of the UEs and maintaining of cellular connectivity during flight of the UEs without disrupting service to UEs at ground level. For instance, the flight plans may include position information of base stations, which may allow the UEs to point their directional antennas at the base stations to allow better reception and reduce interference. In an aspect, flight of the UEs and maintaining of cellular connectivity may be facilitated with minimal or no changes to structural features, such as the housing, antennas, and/or other components, such that the use of the cellular network (e.g., the base stations) with the UEs at ground level are not affected by the UEs at flight altitude.

In an embodiment, with better reception facilitated by the listing of base stations identified in the flight plan and the use of directional antennas, power dissipation associated with transmitting packets to and/or receiving packets from the base stations may be reduced. In addition, power dissipation associated with scanning for base stations may be reduced or avoided, since the positions of the base stations are identified in the flight plan. The lower power dissipation may increase the duration/distance UEs can travel before needing to be recharged. In this regard, the UEs may reach a destination point faster with fewer or no intermediary stops (e.g., at UAV power docking stations). In terms of infrastructure, the lower power dissipation of individual UEs may allow for a less dense distribution of UAV power docking stations.

Although the description of the present disclosure is made with respect to cellular networks and UAVs, the techniques described herein may be applied to any wireless networks and any UEs navigating at flight altitudes and capable of establishing connectivity in such wireless networks.

FIG. 1 illustrates an example network environment 100 in which a system for facilitating flight plan implementation, generation, and management may be implemented in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. However, in some examples, the network environment 100 may be additionally or alternatively implemented to form part of a satellite communication network, microwave radio network, and/or other wireless networks.

The network environment 100 includes a UAV 105, a user device 120, base stations 125A-E, and a network management system 135. The UAV 105, user device 120, base stations 125A-E, and network management system 135 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

The UAV 105 may include, may be a component of, and/or may be referred to as, a UE. The UAV 105 may include a flight control unit, communication unit, and payload unit. The flight control unit may be configured to facilitate aerial navigation of the UAV 105, e.g., take off, landing, and flight of the UAV 105. The flight control unit may include any appropriate avionics, control actuators, and/or other equipment, along with associated logic, circuitry, interfaces, memory, and/or code.

The communication unit may include one or more radio transceivers (e.g., antennas) along with associated logic, circuitry, interfaces, memory, and/or code that enable communications, e.g. with the user device 120, one or more of the base stations 125A-E, and/or the network management system 135, via wireless interfaces and using the radio transceivers. In FIG. 1, the radio transceivers of the UAV 105 include an omnidirectional antenna 110 and a directional antenna 115. The omnidirectional antenna 110 may be utilized to radiate and/or receive power uniformly in all directions. The directional antenna 115 may be utilized to radiate and/or receive power from a desired direction to allow increased performance (e.g., higher signal strength) in the desired direction, such as through higher gain and directivity and reduced interference due to signals from sources deviating from the desired direction. In this regard, signal strength of command/control links and/or application data channels may be improved, and/or interference of signals from different base stations may be reduced. The omnidirectional antenna 110 and/or directional antenna 115 may be contained within a housing of the UAV 105, or disposed (e.g., mounted) outside a housing of the UAV 105. In some cases, the omnidirectional antenna 110 and/or directional antenna 115 may be movable along and/or rotatable about one, two, or three axes. In other cases, the omnidirectional antenna 110 and/or directional antenna 115 may be fixed (e.g., not movable and not rotatable).

The signal strength may be, or may be based on, measures such as received signal strength indicator (RSSI), reference signal received power (RSRP), reference signal received quality (RSRQ), signal-to-noise ratio (SNR), signal-to-interference-plus-noise ratio (SINR), and/or other measures. Such measures of signal strength may be computed by the UAV 105. In an aspect, signal strength may be referred to as signal quality, signal level, or signal power. A higher signal strength is generally associated with better reception.

In some cases, the communication unit may include suitable logic, circuitry, interfaces, memory, and/or code that enable wired communications, e.g. with the user device 120, one or more of the base stations 125A-E, and/or the network management system 135. In this regard, the UAV 105 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, the UAV 105 may utilize wired connections when at or near ground level, such as a wired connection between the UAV 105 and user device 120 for facilitating testing and/or calibration/setup of the UAV 105.

The payload unit may be configured to implement features supported by the UAV 105 and facilitate implementation of such features. The payload unit may include any equipment and associated logic, circuitry, interfaces, memory, and/or code. The payload unit may include a global positioning system (GPS) that provides a current position of the UAV 105 (e.g., using three coordinates). The position information from the GPS, together with position information of devices in communication with the UAV 105, may allow the UAV 105 to direct the directional antenna 115 to, or to a vicinity of, one or more of these devices. By facilitating establishing and maintaining of connections with higher signal strength, the UAV 105 may facilitate implementation of various features supported by the UAV 105.

Depending on an application(s) of the UAV 105, the payload unit may include one or more onboard sensors, which may be contained within a housing of the UAV 105 or mounted outside the housing of the UAV 105. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras); acoustic sensors, and/or other types of sensors, or combination thereof. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g. the object may be secured within a housing of the UAV 105.

The user device 120 may be, and/or may include, a mobile phone, a personal digital assistant (PDA), a tablet device, a computer, or generally any device that is operable to communicate wirelessly (e.g., via cellular standards using antennas) with the UAV 105, one or more of the base stations 125A-E, and/or the network management system 135. In an aspect, the user device 120 may be a remote control used by an operator (e.g., a human) to provide commands to the UAV 105 when the UAV 105 is within line of sight of the user device 120. For example, the operator may issue commands via the user device 120 to instruct the UAV 105 to fly in certain directions and/or at certain speeds and/or to perform activities such as picking up or delivering an object. In an aspect, the line of sight of the user device 120 may refer to a coverage area or coverage volume within which signals transmitted by the user device 120 to the UAV 105 can be received by the UAV 105 with sufficient signal strength. In some cases, the sufficient signal strength may be a preset threshold level (e.g., SNR level), which may be set during a setup/calibration stage for associating the UAV 105 with the user device 120.

In an embodiment, the UAV 105 and the user device 120 may wirelessly communicate with each other using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, the UAV 105 and the user device 120 may be configured to communicate with each other using a proprietary wireless communication protocol and interface.

In some cases, the UAV 105 and the user device 120 may be configured to interface with a wired network, such as via an Ethernet interface, power-line modem, DSL modem, PSTN modem, cable modem, and/or other appropriate components for wired communication. Alternatively or in addition, the UAV 105 user device 120 may support proprietary wired communication protocols and interfaces. The UAV 105 and the user device 120 may be configured to communicate over a wired link (e.g., through a network router, switch, hub, or other network device) for purposes of wired communication, e.g. such as during testing, setup, and/or calibration stages between the UAV 105 and the user device 120. The UAV 105 may be at or near ground level to receive a wired connection.

Although a single user device (e.g., the user device 120) is shown in FIG. 1, multiple user devices (e.g., multiple devices owned by or otherwise accessible to the same operator) may be utilized to communicate with the UAV 105. For example, the same operator may communicate with the UAV 105 using the user device 120 (e.g., a tablet device) and/or a mobile phone.

One or more of the base stations 125A-E may include, may be a component of, and/or may be referred to as, a cell, a Node B (NB), an Evolved Node B (eNodeB or eNB), or a Home eNB (HeNB). One or more of the base stations 125A-E include suitable logic, circuitry, interfaces, memory, and/or code that enable communications, e.g. with the user device 120, one of the other base stations 125A-E, and/or the network management system 135, via wireless interfaces and utilizing one or more radio transceivers (e.g., antennas).

The base stations 125A-E may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, the base stations 125A, 125B, 125C, 125D, and 125E have nominal coverage area 130A, 130B, 130C, 130D, and 130E, respectively, at ground level or near ground level. The coverage area of a base station may be different in different environments, at different altitudes, and at different frequency bands. For example, a base station may have a smaller coverage area on a rainy day than the same base station on a sunny day, e.g. due to attenuation of signals by rain. When altitudes are taken into consideration, the coverage area provided by the base stations 125A-E may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. As used herein, the coverage area and coverage volume may be referred to more generally as a coverage region, where the region may be two-dimensional (e.g., coverage area) or three-dimensional (e.g., coverage volume).

The network management system 135 may be, may include, and/or may be a component of, a core network for processing information from UAVs (e.g., the UAV 105), user devices (e.g., the user device 120), and/or base stations (e.g., the base stations 125A-E) and managing connections of the UAVs and/or user devices to the base stations. For example, the network management system 135 may be, may include, and/or may be in communication with, a mobile telephone switching office (MTSO). The network managing system 135 and the base stations 125A-E may be provided by a mobile network operator. The network management system 135 includes suitable logic, circuitry, interfaces, memory, and/or code that enable communications, e.g. with one or more of the base stations 125A-E and/or one or more UEs (e.g., the UAV 105, the user device 120), via wireless interfaces and utilize one or more radio transceivers. In this regard, the network management system 135 may be dedicated to facilitate connectivity of UAVs (or other vehicles/devices at flight altitude) with the base stations 125A-E (and/or other base stations), or may be utilized to facilitate connectivity of UAVs and ground-based devices with the base stations 125A-E (and/or other base stations).

In an aspect, the network management system 135 may be, may include, or may be a part of, a server (e.g., a centralized server) that can generate and distribute information to the user device 120 and/or base stations 125A-E. The user device 120 and/or the base stations 125A-E may then relay the information from the network management system 135 to the UAV 105. In some cases, when the UAV 105 is in range of the network management system 135, the network management system 135 may transmit information directly to the UAV 105. In an aspect, the network management system 135 may provide each of the base stations 125A-E with respective information (e.g., position, obstacle, weather, emergency broadcast information) to be transmitted (e.g., broadcasted) by the base stations 125A-E. For example, the network management system 135 may be in communication with one or more sources (e.g., sensors, meteorological services, information services) that provide the network management system 135 with obstacle information, weather information, traffic information, and/or emergency broadcast information. The network management system 135 may then relay the information received from these sources to the base stations 125A-E. In general, at least some of the information is different for each base station.

The base stations 125A-E may be in communication with the network management system 135 through a backhaul network. The network management system 135 may be in direct communication with one or more of the base stations 125A-E or in communication with one or more of the base stations 125A-E through one or more intermediary base stations. For example, in FIG. 1, the network management system 135 is in direct communication with the base stations 125A-E. In other cases, a base station may be in communication with the network management system 135 via one or more intervening base stations.

In some aspects, the base stations 125A-E may individually store or otherwise have access to a neighbor list that includes neighboring relationships of a base station with other base stations. The neighbor list may be an automatic neighbor relation (ANR) table. In some cases, the neighboring relationships may be based on measurement reports from UEs (e.g., the UAV 105). The measurement reports may include signal strengths (e.g., RSSI, RSRP, etc.) of signals from the base stations 125A-E that are received and measured by the UEs.

In some cases, the network management system 135 may generate, store, maintain, and/or update the neighbor list. For example, the neighbor list for the base station 125A may be generated by the network management system 135 based on measurement reports provided by the UEs to the base station 125A and relayed by the base station 125A to the network management system 135. Alternatively or in addition, the network management system 135 may generate the neighbor list based on signal strength statistics, such as RSRP or RSSI variances, average SNR, average SINR, and/or generally any other signal strength statistics computed based on one or more signals received and measured by the UEs. The statistics may be computed by the UEs, the base stations 125A-E, and/or the network management system 135.

If the base station 125A receives comparative signal strengths from the UAV 105 for the base stations 125A and 125B, the base station 125A and/or the network management system 135 may determine that the base stations 125A and 125B can be referenced as neighboring base stations on the neighbor list. In an aspect, multiple neighbor lists may be generated for each base station. For example, one neighbor list for the base station 125A may be generated based on measurement reports from UEs at ground level (or near ground level), whereas a different neighbor list may be generated based on measurement reports from UEs at flight altitudes (e.g., UAVs).

In some cases, the neighbor list may include position information (e.g., longitude, latitude, altitude) of each base station on the neighbor list and/or otherwise provide information indicative of the position information of each base station. For example, the position information may allow the UAV 105 to transition the directional antenna 115 from pointing at the base station 125A to pointing at one of the base stations on the neighbor list for the base station 125A, such as when the UAV 105 is getting farther from the base station 125A and/or closer to a neighboring base station of the base station 125A. In some cases, the neighbor list may include other information (e.g., obstacle information, weather information, etc.) for each base station on the neighbor list.

In an aspect, the network management system 135 may determine and/or have access to signal strength statistics at different positions (e.g., altitudes) and/or different frequency bands, e.g. based on the measurement reports generated by the UEs. In some cases, the network management system 135 may determine preferred frequency bands to be utilized at various altitudes based on the signal strength statistics. The network management system 135 may provide the signal strength statistics to the base stations 125A-E, e.g. to be relayed to UEs.

In some embodiments, the network management system 135 may be, may include, may be a part of, or may be in communication with, a flight plan management system for processing information from aerial devices such as UAVs (e.g., the UAV 105), devices at or near ground level (e.g., the user device 120), and/or base stations (e.g., the base stations 125A-E), and generating and managing flight plans of the aerial devices. Although FIG. 1 illustrates a case in which the flight plan management system is a part of the network management system 135, in other embodiments, the flight plan management system may be separate from the network management system 135, such as in different housings and/or in different geographic locations. In this regard, for explanatory purposes, the description is with respect to determining and managing flight plans using the network management system 135, although in other embodiments determining and managing flight plans may be realized using one or more flight plan management systems that are a part of the network management system 135, and/or one or more flight plan management systems that are separate from the network management system 135.

In an aspect, the generation and management of the flight plans (e.g., via the network management system 135 and/or other flight plan management system) may be provided by the same mobile network operator that provides the network managing system 135 and the base stations 125A-E, one or more other mobile network operators, and/or another party. The flight plans may be generated and managed to facilitate cellular connectivity of devices (e.g., devices at or near ground level, devices at flight altitude) and facilitate flight of devices at flight altitude. In some cases, cellular connectivity and/or flight plan generation/management may be provided to subscribed UEs only. In other cases, cellular connectivity and/or flight plan generation may be provided to subscribed UEs as well as unsubscribed UEs (e.g., with an additional fee for unsubscribed UEs).

In some embodiments, the network management system 135 provided by a mobile network operator may utilize traffic information, including air traffic information, associated with devices connecting to cellular networks provided by the mobile network operator, as well as traffic information (e.g., air traffic information) not associated with cellular networks provided by the mobile network operator. In this regard, in some cases, in generating the flight plans by the mobile network operator, the network management system 135 may determine air traffic information that is not associated with the mobile network operator. Air traffic information not associated with the mobile network operator may include air traffic information associated with other mobile network operators, air traffic information associated with non-network devices (e.g., UAVs used as emergency beacons), air traffic information associated with government agencies, and/or other information relating to air traffic not associated with the mobile network operator. In some cases, the network management system 135 may receive air traffic information from one or more other mobile network operators, such as flight plans generated by other mobile network operators. In some cases, the network management system 135 may receive air traffic information from another party, such as from local authorities that manage air traffic sensors and/or generate/distribute air traffic statistics, crowdsourcing (e.g., from users that provide air traffic information about particular locations and/or air traffic incidences), and/or other sources.

In an aspect, in some scenarios/applications, a UAV may be utilized to fly over its flight route to collect air traffic information along the flight route. In other words, collection of the air traffic information may be the primary task of effectuating the flight plan. The UAV may be set to utilize an antenna to scan for signals and process received signals en route over the flight route. In some cases, the UAV may utilize a directional antenna(s) and/or an omnidirectional antenna(s) while flying over the flight route. For instance, the UAV may utilize a directional antenna to determine characteristics (e.g., channel, signal strength) associated with base stations whose locations are known to the UAV (e.g., provided as part of the flight plan or otherwise known), e.g. to evaluate such base stations. The UAV may utilize an omnidirectional antenna to locate base stations (e.g., including those not known to the UAV) and determine characteristics of these base stations. In this case, the UAV may also determine a position (e.g., longitude, latitude, altitude) of the base stations.

The UAV may provide (e.g., transmit, or store and transmit at a later time) the determined characteristics to the network management system 135. The UAV may also provide to the network management system 135 a position, heading, and/or speed of the UAV, direction pointed at by a directional antenna (if applicable), and/or other characteristics associated with the UAV when the signals from the base stations were received. The network management system 135 may utilize such information (e.g., air traffic information) from the UAV to generate traffic statistics and flight plans, e.g. determine flight routes, preferred base stations in different regions, and/or other flight rules.

Alternatively or in addition, operators of UAVs may allow (e.g., may set) the UAVs to obtain air traffic information as part of a separate/secondary task (e.g., a primary task may be cargo delivery). In this regard, the UAVs may be set to process signals even from base stations not on the listing of base stations to determine characteristics of the base stations. In this case, a portion of the air traffic information available to the network management system 135 may be from crowdsourcing (e.g., from the UAVs).

In an embodiment, the traffic information may include information associated with the base stations 125A-E and/or other base stations provided by one or more mobile network operators. In an aspect, the network management system 135 may have, and/or may be able to retrieve, information associated with the base stations 125A-E and/or other base stations provided by one or more mobile network operators. For example, the network management system 135 may have one or more identifier(s) for identifying the base stations 125A-E and/or requesting (e.g., retrieving) information from the base stations 125A-E. The information may include, or may be utilized to determine, performance characteristics associated with the base stations 125A-E. By way of non-limiting example, the performance characteristics may include accessibility (e.g., radio resource control (RRC) setup success rate), mobility (e.g., handover success rate), utilization/occupancy, and/or other characteristics. In some cases, the performance indicators may be, may include, or may be referred to as, key performance indicators (KPIs). Examples of KPIs may include those provided in the 3GPP standard, including accessibility, retainability, integrity, availability, and mobility.

For example, the utilization/occupancy (also referred to as utilization rate or occupancy rate) associated with a base station may be, or may be indicative of, a ratio of an average amount of data traffic associated with the base station to a capacity of the base station (e.g., amount of data traffic that can be supported at any given time by the base station). The utilization/occupancy associated with the base station may be different for different times of day and/or different days of the week, may be different on holidays, etc. The flight plans may be generated based at least in part on the utilization/occupancy information of different base stations, such as to better distribute data traffic among the base stations to reduce probability of overloading some base stations and underutilizing other base stations. The data traffic associated with UEs (e.g., different types of UEs) may be determined and taken into consideration when generating the flight plans. In this manner, efficiency of the cellular network may be improved.

In an aspect, the traffic information may include flight statistics associated with the base stations 125A-E and/or other base stations. In some cases, the network management system 135 may generate the flight statistics. The flight statistics may include information pertaining to each base station's inclusion in flight plans. For example, for a given base station, the flight statistics may provide a percentage of flight plans that include the base station in a listing of preferred base stations, busiest days and/or times of air traffic associated with the base station, base stations commonly included together with the base station in the listing of preferred base stations, and/or other information associating flight plans with the base station. The network management system 135 may generate and manage (e.g., update, adjust) neighbor lists of the base stations 125A-E and/or other base stations based at least in part on the flight statistics. In cases in which the network management system 135 is separate from the flight plan management system, the flight plan management system may provide to the network management system 135 the flight statistics and/or information from which the flight statistics can be derived.

In some cases, the network management system 135 may generate a flight plan and transmit the flight plan to the UAV 105 directly or indirectly. For instance, the network management system 135 may provide the flight plan to the user device 120, and the user device 120 may relay the flight plan to the UAV 105. In some cases, the network management system 135 may generate and provide one or more potential flight plans to the UAV 105 and/or user device 120. An operator of the UAV 105 and/or user device 120 may select the flight plan to be utilized.

In other cases, the user device 120 may generate a flight plan and transmit the flight plan to the network management system 135. In response to receiving the operator's proposed flight plan, the network management system 135 may provide authorization for the operator's proposed flight plan, provide authorization for an adjusted version of the operator's proposed flight plan (e.g., adding flight rules to be implemented), and/or provide authorization for one or more alternative flight plans (e.g., flight plans preferred by the network management system 135).

When generating and managing flight plans for UAVs and/or other devices at flight altitude, the network management system 135 complies with FAA requirements or recommendations, including temporary flight restrictions (e.g., temporary event such as wildfire or security-related event, stadiums/sporting events), restricted airspace, airport-related restrictions, local flight ordinances, and/or others. Other flight recommendations and/or requirements may be taken into consideration, such as any recommended or required minimum/maximum flight altitude and/or minimum/maximum flight speed. Similarly, the UAV 105 is operated to maintain a minimum distance separation between the UAV 105 and other UAVs, and/or between the UAV 105 and obstacles, e.g. such as minimum distance separation requirements or recommendations from the FAA.

With reference to FIG. 1, flight beyond the line of sight of the UAV 105 may be facilitated through a pre-programmed flight plan, e.g. provided by the user device 120 and/or network management system 135. The flight plan may include a flight route generated based on a starting point 140A and a destination point 140B, e.g. provided by an operator. The flight route may be defined by a set of points, including points 145A, 145B, 150A, and 150B labeled in FIG. 1, at which the UAV 105 is located, has been located, or is expected to be located. Each point may be associated with a set of three-dimensional coordinates (e.g., longitude or longitude range, latitude or latitude range, altitude or altitude range). For example, in delivery applications, the starting point 140A may be a warehouse at which the UAV 105 is provided with the payload (e.g., a package) to be delivered and the destination point 140B may be, for example, a customer's house, a post office or courier service office, or other destination from which the payload is to be routed to the customer.

The flight route may include changes in latitude, longitude, and/or altitude throughout the route, as shown in FIG. 1 for example. In this regard, the network management system 135 may determine that a shortest path between two base stations may not be feasible (e.g., due to temporary or permanent obstacles) and/or may not be associated with efficient air traffic (e.g., in presence of other UAVs). For instance, in some cases, while the shortest path may be implemented in geographic areas in which air traffic is sparse, the shortest path is not necessarily optimal for cases in which the air traffic is heavy with UAVs of different sizes, shapes, speeds, and/or applications. For example, the network management system 135 may determine that a smoother (e.g., fewer turns and/or fewer changes in altitude) but lengthier route would be preferable to a shorter distance route for a UAV that is carrying a fragile payload (e.g., customer package, fragile equipment), e.g. to reduce probability of the payload being damaged. In some cases, the flight route may identify the positions of one or more charging stations that the UAV may utilize if needed.

At the points 145A and 150A, the UAV 105 may be within the line of sight of the user device 120. Within the line of sight, the UAV 105 may receive control signals directly from the user device 120. At the points 145B and 150B, the UAV 105 may be beyond the line of sight of the user device 120. Different base stations may provide better signal strength at the different points 145A, 145B, 150A, and 150B. For example, among the base stations 125A-E, the base station 125A may be generally associated with the highest signal strength at the point 145A, whereas the base station 125B may be generally associated with highest signal strength at the point 150A.

As shown in FIG. 1, the coverage areas 130A-E of the base stations 125A-E may overlap. The coverage areas 130A-E may represent the coverage areas of the base stations 125A-E at ground level. The UAV 105 may be within range of two or more of the base stations 125A-E. For example, the UAV 105 may be within range of the base stations 125A and 125B in an overlap region 155. Based on a specific position of the UAV 105, signal strength between the UAV 105 and the base station 125A may be different from (e.g., stronger than, weaker than) signal strength between the UAV 105 and the base station 125B. In some cases, the overlap in the coverage regions may be more pronounced at flight altitudes than at ground level, such as due to fewer obstructions.

In addition to the flight route, the flight plan may include flight rules associated with flying over the flight route. In this regard, the flight rules provide constraints on how flight over the flight route may be implemented, e.g. by the UAV 105. The flight rules may facilitate the sharing of the airspace by the UAVs and/or other aerial devices. In some cases, the flight rules may identify a start time and/or an end time (e.g., expected end time) at which the flight route may be implemented (e.g., traversed).

The flight rules may indicate base stations for the UAV 105 to utilize for cellular connectivity while flying over the flight route. In this regard, the flight plan information may include positions (e.g., in three dimensions) of each base station (e.g., positions of antenna element of each base station) on the listing of base stations, frequency at which to communicate with each base station, and/or other information for facilitating connection by the UAV 105 with the base stations. In an aspect, the base stations may be indicated in a listing of base stations provided as part of the flight plan information to the UAV 105. For example, in FIG. 1, the listing of base stations may include one or more of the base stations 125A-E. The listing of base stations may include a listing of preferred base stations. In an aspect, the usage of the preferred base stations may facilitate distribution of utilization/occupancy of the base stations (e.g. to reduce overloading of some base stations underutilizing other base stations) while allowing the UAV 105 to maintain cellular connectivity while flying over the flight route.

In some cases, the listing of base stations may include additional base stations to which the UAV 105 may connect to while flying over the flight route. For example, the additional base stations may be, or may include, neighboring base stations of the preferred base stations. The additional base stations may be utilized when preferred base stations are obstructed, associated with a low signal strength (e.g., signal strength below a threshold value), and/or otherwise unavailable/undesirable to the UAV 105. Such situations are generally unanticipated/unexpected by the network management system 135 at the time of generating the flight plan. In some cases, the flight rules may identify these situations and how the UAV 105 can handle these situations.

Figure 2:
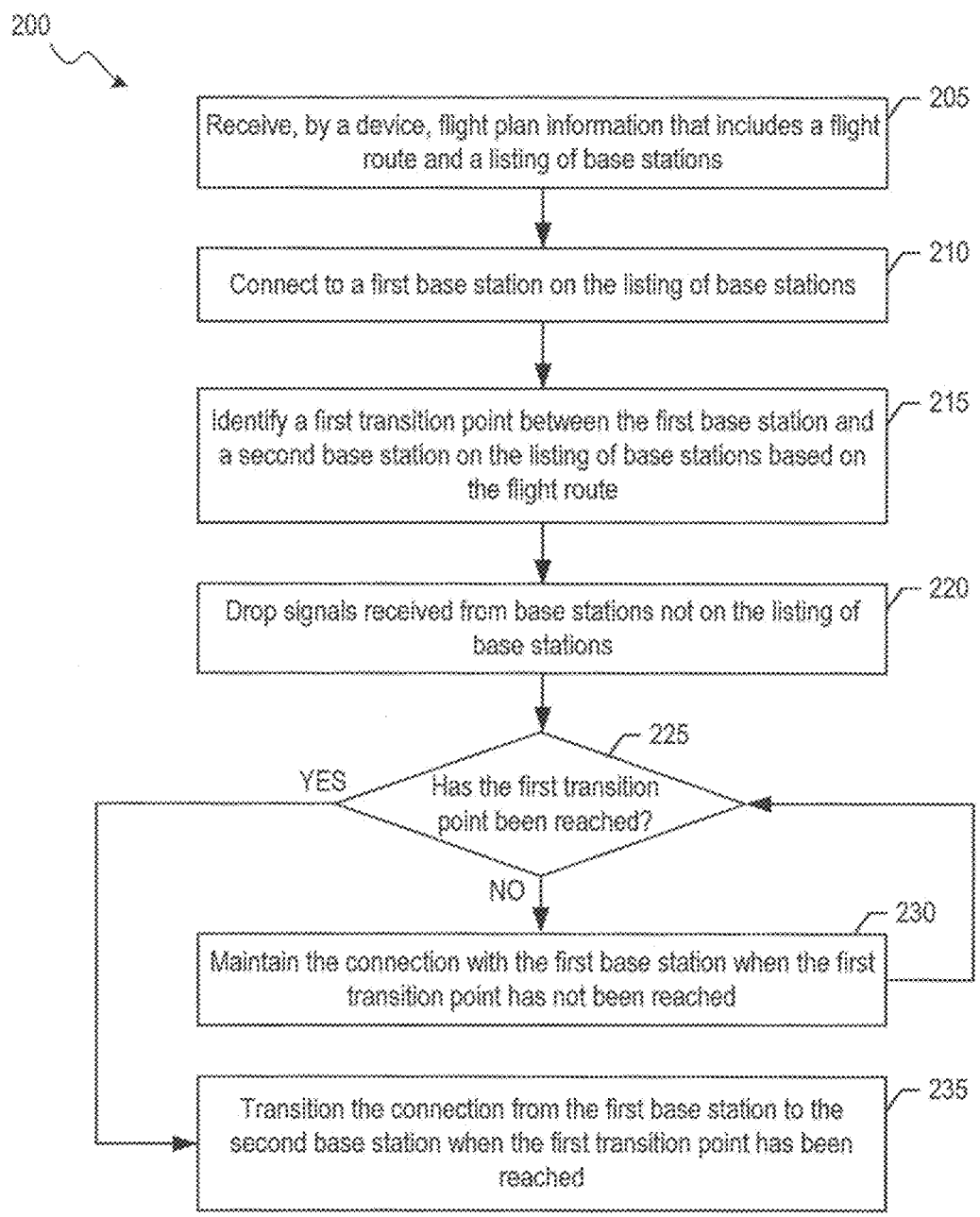
FIGS. 2 and 3 illustrate flow diagrams of example processes for facilitating implementation of flight plans in accordance with one or more embodiments of the present disclosure.

FIG. 2 illustrates a flow diagram of an example process 200 for facilitating implementation (e.g., effectuation) of flight plans in accordance with one or more embodiments of the present disclosure. For explanatory purposes, the example process 200 is described herein with reference to the example network environment 100 of FIG. 1; however, the example process 200 is not limited to the example network environment 100 of FIG. 1. For example, the example process 200 may be with reference to one or more UEs (e.g., UAVs) and/or one or more base stations not shown in FIG. 1. In an aspect, the example process 200 is associated with traversing a first portion of a flight route of a flight plan. Note that one or more operations may be combined, omitted, and/or performed in a different order as desired.

At block 205, the UAV 105 receives flight plan information that includes a flight route and a listing of base stations. The flight route may be based on the beginning point 145A and the end point 145B provided by an operator, e.g. to the network management system 135 via the UAV 105 and/or the user device 120. The flight route may begin at the beginning point 145A and end at the end point 145B. The UAV 105 may receive the flight plan from the user device 120, the network management system 135, and/or other device. For example, the user device 120 may receive the flight plan information from the network management system 135 and load the flight plan information into the UAV 105. In some cases, the flight plan information may provide a start time and/or an end time (e.g., expected end time) at which the flight plan may be implemented (e.g., flight route may be traversed).

By way of non-limiting example, the listing of base stations includes the base stations 125A-C. In some cases, the listing of base stations may be an ordered listing of base stations, in which the flight plan indicates the order in which the UAV 105 connects to the base stations on the listing of base stations. For example, with reference to FIG. 1, the ordered listing of base stations may list the base station 125A as a first base station on the listing, the base station 125B as a second base station on the listing, and the base station 125C as a third base station on the listing. In some cases, the listing of base stations may identify additional base stations to which the UAV 105 may connect. The additional base stations may include neighboring base stations of the base stations on the listing of base stations. For instance, the base stations 125D and 125E may be additional base stations on the listing of base stations. A flight rule may indicate that the UAV 105 may connect to one of these additional base stations when the base stations on the listing of base stations are obstructed, associated with a low signal strength (e.g., signal strength below a threshold value), and/or otherwise unavailable/undesirable to the UAV 105.

In some cases, alternatively or in addition, the order in which to connect to the base stations 125A-C on the listing may be determined by the UAV 105 and/or the user device 120. For example, the UAV 105 and/or the user device 120 may determine an order in which the UAV 105 will reach each of the base stations 125A-C on the listing of base stations, and utilize this determined order as the order in which to connect to the base stations during flight of the UAV 105 over the flight route.

At block 210, the UAV 105 connects to the base station 125A. For instance, the base station 125A may be a first base station on the listing of base stations. In an aspect, the UAV 105 may determine its position relative to the position of the base station 125A (e.g., an antenna of the base station 125A) and accordingly point the directional antenna 115 at the base station 125A. The position of the base station 125A may be provided as part of the flight plan information. By pointing the directional antenna 115 at the base station 125A, the signal strength of signals received from and/or transmitted to the base station 125A by the UAV 105 may be higher, e.g. relative to a case in which the directional antenna 115 is randomly pointed. In some cases, the UAV 105 may connect to the base station 125A prior to flying and/or prior to traversing the flight route identified in the flight plan information.

At block 215, the UAV 105 identifies the transition point 150A. In an aspect, the UAV 105 may determine (e.g., define) a position or range of positions of the transition point 150A. For example, the UAV 105 may determine the distance between the base station 125A and the base station 125B and determine a position or range of positions at which to transition from connecting to the base station 125A to connecting to the base station 125B. The determined position or range of positions defines the transition point 150A. As another example, the user device 120 and/or the network management system 135 may define the transition point 150A and provide the position or range of positions of the transition point 150A to the UAV 105, e.g. as part of the flight plan information. In this example, the UAV 105 may receive and utilize the position or range of positions of the transition point 150A (e.g., as part of the flight plan information) from the user device 120 and/or the network management system 135.

In some aspects, the transition point 150A may be set based on a distance between the base station 125A and the base station 125B, or a relative position of the base station 125A and the base station 125B. For example, the UAV 105, user device 120, and/or network management system 135 may set the transition point 155A at a position at certain distances from the base station 125A and/or a position at certain distances from the base station 125B.

At block 220, the UAV 105 drops signals received from base stations not on the listing of base stations. In an aspect, the UAV 105 may drop the signals at any time the UAV 105 is traversing the flight route in accordance with the flight plan. In an aspect, for a signal received by the UAV 105, the UAV 105 processes the signal to obtain (e.g., extract) one or more identifiers in the signal that identify the base station that transmitted the signal. The UAV 105 may determine that the base station is not on the listing of base stations when the identifier(s) of the base station (e.g., cell identifiers (cell IDs)) does not match the identifiers of the base stations on the listing of base stations.

When the UAV 105 determines that the base station is not on the listing of base stations, the UAV 105 may drop the signal without further processing the signal. In this manner, computational resources and power of the UAV 105 may be conserved. In an aspect, the UAV 105 may drop (e.g., ignore, not scan/listen for) signals from base stations not on the listing of base stations, even in cases when signal strength of signals received from the base stations not on the listing is higher than signal strength of signals from the base stations 125A-C on the listing of base stations. In this regard, the UAV 105 is configured to not connect to base stations not identified on the listing of base stations. In addition, the UAV 105 may conserve power and computational resources by reducing scanning needed to locate base stations, since such information is provided as part of the flight plan information.

At block 225, the UAV 105 determines whether the transition point 150A has been reached. In this regard, the UAV 105 may determine its position relative to the position or range of positions of the transition point 150A. When the UAV 105 determines that the transition point 150A has not been reached, the UAV 105 maintains the connection with the base station 125A at block 230. In an aspect, during flight of the UAV 105, the UAV 105 may adjust the directional antenna 115 to continue pointing the directional antenna 115 at the base station 125A. The UAV 105 may continue to monitor its position (e.g., latitude, longitude, altitude) and compare its position with the position of the transition point 150A to determine whether the first transition point has been reached.

When the UAV 105 determines that the transition point 150A has been reached, the UAV 105 transitions the connection from the base station 125A to the base station 125B at block 235. In an aspect, the UAV 105 may adjust the directional antenna 115 to point at the base station 125B rather than at the base station 125A when the transition point 150A has been reached. For instance, the base station 125B may be a second base station on the listing of base stations.

Figure 3:
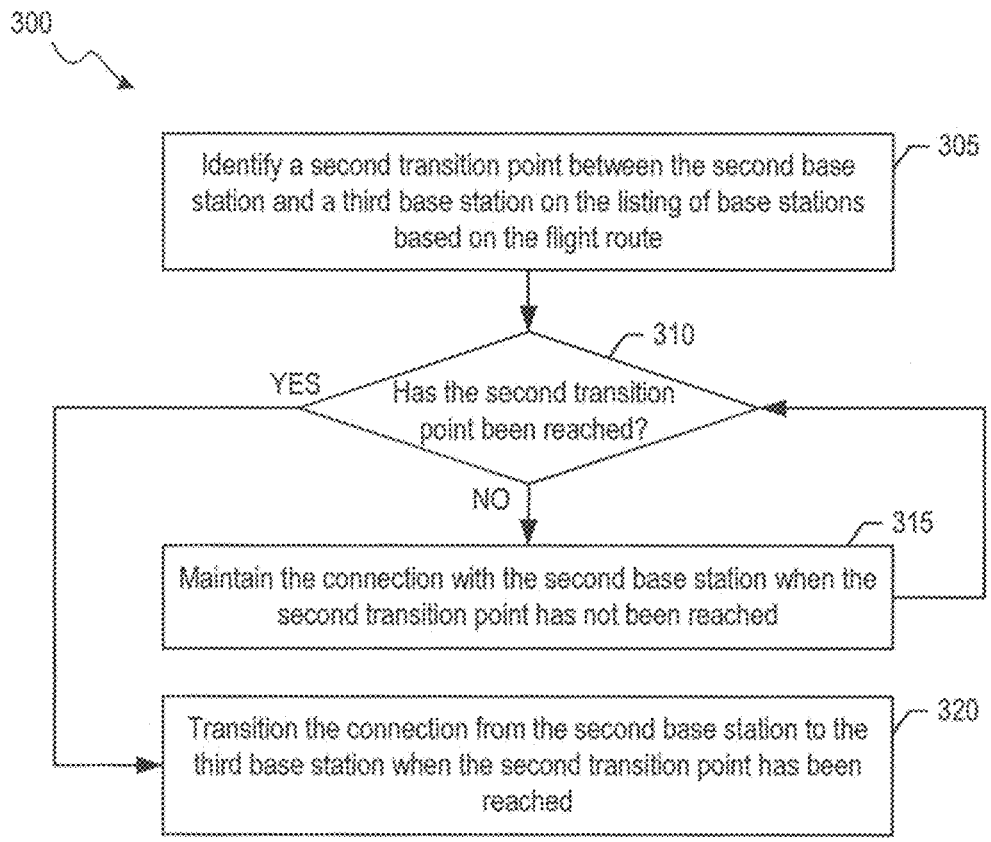

FIG. 3 illustrates a flow diagram of an example process 300 for facilitating implementation (e.g., effectuation) of flight plans in accordance with one or more embodiments of the present disclosure. For explanatory purposes, the example process 300 is described herein with reference to the example network environment 100 of FIG. 1; however, the example process 300 is not limited to the example network environment 100 of FIG. 1. For example, the example process 300 may be with reference to one or more UEs (e.g., UAVs) and/or one or more base stations not shown in FIG. 1. In an aspect, the example process 300 is associated with traversing a second portion of a flight route of a flight plan, and/or may be performed after the example process 200. Note that one or more operations may be combined, omitted, and/or performed in a different order as desired.

For explanatory purposes, the example process 300 is performed after the example process 200. At block 305, the UAV 105 identifies the transition point 150B. The UAV 105 may determine the position or range of positions of the transition point 150B and/or receive the position or range of positions of the transition point 150B from the user device 120 and/or the network management system 135. In some aspects, the transition point 150B may be set based on the relative positions of the base station 125B and the base station 125C. At block 310, the UAV 105 determines whether the transition point 150B has been reached. When the UAV 105 determines that the transition point 150B has not been reached, the UAV 105 maintains the connection with the base station 125B at block 315. When the UAV 105 determines that the transition point 150B has been reached, the UAV 105 transitions the connection from the base station 125B to the base station 125C at block 320. For instance, the base station 125C may be a third base station on the listing of base stations.

In an aspect, operations of the example process 300 may be performed for each remaining transition point along the flight route. The UAV 105 may ignore (e.g., drop, not scan/listen for) signals received from base stations not on the listing of base stations at any time that the UAV 105 is following the flight route of the flight plan information. In this regard, the UAV 105 does not need to drop signals received from base stations not on the listing of base stations prior to traversing over the flight route and after completing the flight route.

In some cases, transition points (e.g., the transition points 150A-B) of the entire flight route may be determined prior to flying over the flight route. The transition points may be determined by the UAV 105, the user device 120, and/or the network management system 135. In other cases, the transition points may be determined by the UAV 105 as the UAV 105 flies over the flight route. The transition points divide the flight route into multiple portions. In FIG. 1, the transition points 150A and 150B divide the flight route into portions 160A, 160B, and 160C. In the portions 160A, 160B, and 160C, the UAV 105 may maintain connection with the base station 125A, 125B, and 125C, respectively.

In some cases, while flying over a portion, the UAV 105 may ignore (e.g., drop, not scan/listen for) signals from all base stations aside from the base station to which connection is to be maintained in the portion. For example, while flying over the portion 160A, the UAV 105 may ignore signals from all base stations aside from the base station 125A, including ignoring signals from the base station 125B. In other cases, while flying over a portion, the UAV 105 may ignore signals from all base stations aside from the base station to which connection is to be maintained in the portion, and the next base station to which the UAV 105 will connect. For example, while flying over the portion 160A, the UAV 105 may ignore signals from all base stations aside from the base stations 125A and 125B. In an aspect, whether or not to ignore signals from base stations on the listing of base stations may be indicated by a flight rule(s).

In an aspect, the starting point 140A coincides with a beginning point of the flight route and/or the destination point 140B coincides with an end point of the flight route. In another aspect, such as shown in FIG. 1, the starting point 140A does not coincide with the beginning point 145A of the flight route and the destination point 140B does not coincide with the end point 145B of the flight route. In some cases, a distance from the starting point 140A to the beginning point 145A of the flight route may be referred to as a first mile that precedes the flight route. In some cases, a distance from the end point 145B of the flight route to the destination point 140B may be referred to as a last mile that follows the flight route. An example distance for the first mile or the last mile may be around 50 meters. In some cases, such as when the starting point 140A and destination point 140B are at or near ground level, the first mile and the last mile may be associated with higher path losses (e.g., from reflection, refraction, and/or diffraction of signals), more obstructions, and/or generally more factors that change at a fast rate and/or are not readily qualifiable and/or quantifiable by the network management system 135 when generating and maintaining the flight plan.

In this regard, in FIG. 1, during the first mile, the UAV 105 may navigate from the starting point 140A to the beginning point 145A of the flight route over a path 165A. During the last mile, the UAV 105 may navigate from the end point 145B of the flight route to the destination point 140B over a path 165B. The paths 165A and 165B may be traversed autonomously by the UAV 105. In some cases, the UAV 105 may leverage its onboard sensors and/or any geographic information (e.g., obstacle information, weather information, traffic information, emergency broadcast information) it may have to navigate over the paths 165A and/or 165B. The UAV 105 may connect to any appropriate base station (e.g., the base station associated with highest signal strength) when navigating the first mile and last mile. For example, in some cases, the UAV 105 may connect to the base station 125A prior to reaching the beginning point 145A of the flight route. In some cases, the UAV 105 may be in line of sight range of the user device 120 near the starting point 140A and/or the destination point 140B. In such cases, the operator may support aerial navigation of the UAV 105 during the first mile, last mile, and/or generally when the UAV 105 is outside of the flight route.

The flight plan may specify a start time at which the UAV 105 is to depart from the starting point 140A. Alternatively, the flight plan may specify the start time as the time at which the UAV 105 starts the flight route at the beginning point 145A. The flight plan may specify an end time (e.g., expected end time) at which the UAV 105 is to reach the destination point 140B. Alternatively, the flight plan may specify an end time (e.g., expected end time) at which the UAV 105 is to reach the end point 145B of the flight route. It is noted that the starting point 140A and/or the destination point 140B may be, but need not be, at ground level. For instance, in some scenarios/applications, the destination point 140B may be a target location at flight altitude at which the UAV 105 acquires sensor data (e.g., audio, image, video, and/or other sensor data).

In some aspects, the operator may allow (e.g., may set) the UAV 105 to process signals received from base stations not on the listing of base stations, e.g. rather than dropping them upon (e.g., immediately upon) identifying the base stations that transmitted the signals are not on the listing. In processing a signal from a base station, the UAV 105 may determine characteristics associated with the base station, such as a position (e.g., longitude, latitude, altitude) of the base station, a channel (e.g., frequency band) of the base station, signal strength of the signal, and/or other characteristics associated with the base station and/or signal transmitted by the base station. The UAV 105 may provide (e.g., transmit, or store and transmit at a later time) the determined characteristics to the network management system 135. The UAV 105 may also provide a position, heading, and/or speed of the UAV 105, direction pointed at by the directional antenna 115, and/or other characteristics of the UAV 105 when the signal from the base station was received. The network management system 135 may utilize such information from the UAV 105 (and/or other UAVs) to facilitate generation of traffic statistics and/or flight plans.

In some embodiments, the network management system 135 may generate flight plans to be pre-programmed (e.g., preloaded) into UAVs (e.g., the UAV 105) based on information provided by the operator(s) of the UAVs, including starting points (e.g., 140A) and/or destination points (e.g., 140B) and/or geographic information associated with geographic regions encompassing the starting points and destination points. The network management system 135 may facilitate the maintaining of cellular connectivity and transitioning connectivity between different base stations by the UAVs (e.g., such as in handovers of the UAVs between different base stations) during flight of the UAVs over their respective flight routes. In some cases, the network management system 135 may allow air traffic to be distributed at flight altitude (e.g., to reduce traffic congestion and/or collisions) and/or cellular traffic to be distributed (e.g., to reduce overloading of some base stations and underutilization of other base stations), thus facilitating efficient use of the airspace and the cellular network.

The network management system 135 may generate the flight plan, including the flight route and flight rules, based on information communicated (e.g., directly or indirectly) to the network management system 135 by the UAV 105 and/or the user device 120. The information from the UAV 105 and/or the user device 120 may include the starting point 140A and the destination point 140B that the UAV 105 needs to traverse, e.g. to perform an action such as delivering a package from the starting point 140A to the destination point 140B. In some cases, the UAV 105 and/or user device 120 may provide other information to the network management system 135. By way of non-limiting example, such information may include a preferred departure time(s) (e.g., from the starting point), a preferred arrival time(s) (e.g., at the destination point), a preferred flight duration, characteristics/capabilities of the UAV 105 (e.g., size, shape, battery capacity, average flight speed, maximum flight speed, maximum flight altitude, wind resistance), characteristics associated with the requested flight (e.g., application of the requested flight, importance of meeting a departure time and/or an arrival time, presence of fragile payload, expected cellular traffic), and/or other characteristics associated with flight from the starting point 140A to the destination point 140B.

In response, the network management system 135 may generate a flight plan based on the starting point 140A, destination point 140B, and other information provided to the network management system 135. To this end, the network management system 135 may identify a geographic region (e.g., define boundaries of a geographic region) that encompasses the starting point 140A and the destination point 140B. The network management system 135 may define the geographic region to narrow the geographic scope the network management system 135 needs to consider when determining the flight plans, e.g. to conserve on computation time and resources. Different flight plans may be associated with different geographic regions.

Figure 4:
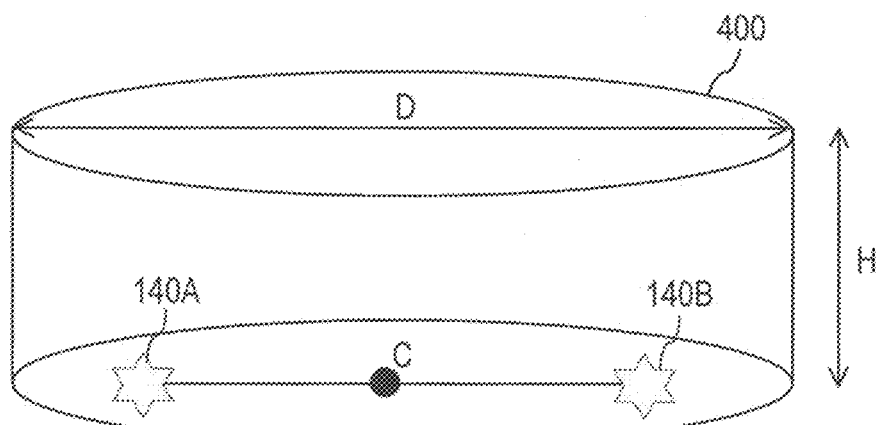
FIG. 4 illustrates an example of boundaries of a geographic region that encompasses a starting point and a destination point.

In an aspect, the boundaries of the geographic region may be defined based on a distance (e.g., shortest, linear distance) between the starting point 140A and the destination point 140B. As an example, FIG. 4 illustrates an example of boundaries of a geographic region that encompasses the starting point 140A and the destination point 140B of FIG. 1. The geographic region may be bound by a cylinder 400 with a center C of a bottom base at a midpoint between the starting point 140A and the destination point 140B and a base diameter D larger than the distance between the starting point and the destination point. In some cases, the distance utilized to generate the geographic region may be a projection of the distance between the starting point 140A and the destination point 140B onto ground level (e.g., to ignore any altitude difference between the starting point 140A and the destination point 140B). For instance, when the distance between the starting point 140A and destination point 140B are 30 miles apart at ground level, the base diameter may be 40 miles in length. A height H of the cylinder 400 may be a flight altitude higher than that generally associated with UAVs, such as higher than 400 feet.

The network management system 135 may also generate the flight plan based on geographic information. The geographic information may include position information, obstacle information, weather information, traffic management information (e.g., air traffic management information), emergency/critical broadcast information, and/or generally any other static and dynamic information associated with the geographic region. The position information may be three-dimensional positions, including altitudes, associated with the geographic region, such as positions of the starting point 140A, destination point 140B, and base stations (e.g., the base stations 125A-E and/or other base stations) within the geographic area. The obstacle information may identify buildings, bridges, trees, base stations, mountains, and/or other obstacles that may affect flight of the UAVs, and positions (e.g., in three-dimensions) associated with each obstacle. In some cases, the obstacle information may identify obstacles that may affect takeoff and landing of the UAVs. The weather information may identity weather of the geographic area, such as wind speed/direction, rain, fog, hail, etc. The emergency broadcast information may identify traffic incidences and/or no-fly zones (e.g., temporary no-fly zones due to these traffic incidences).

The traffic management information may include performance indicators, such as KPIs, associated generally with the cellular network and more particularly with the base stations 125A-E and/or other base stations. For example, the traffic management information may include the utilization/occupancy of the base stations. The traffic management information may identify neighbors associated with each base station in the geographic region. In some cases, the traffic management information may provide information indicative of signal strengths at different frequency bands and/or at different positions (e.g., altitudes, longitudes, and/or latitudes). In this regard, the traffic management information may provide preferred frequency bands at different altitudes.

In an aspect, the flight plan may include the flight route to be followed by the UAV 105, the start time at which the UAV 105 is to depart from the starting point 140A, and the end time (e.g., expected end time) at which the UAV 105 is to reach the destination point 140B. In some cases, such as when the starting point 140A and destination point 140B are within a sparsely populated region, the flight plan may include the flight route without specifying the start time and/or end time. For example, in a region with little to no air traffic, the UAV 105 may be flown at any time (e.g., aside from any regulations associated with when UAVs may and may not be flown in a given geographic region).

In some aspects, the flight plan may include flight rules associated with flying over the flight route. The flight rules may indicate base stations for the UAV 105 to utilize for cellular connectivity while flying over the flight route. In an aspect, the base stations may be indicated in the listing of base stations provided as part of the flight plan information to the UAV 105. For example, in FIG. 1, the listing of base stations may include one or more of the base stations 125A-E. The listing of base stations may include a listing of preferred base stations. In some cases, the listing of base stations may include additional base stations to which the UAV 105 may connect to while flying over the flight route. For example, the additional base stations may be, or may include, neighboring base stations of the preferred base stations. The additional base stations may be utilized when preferred base stations are obstructed, associated with a low signal strength (e.g., signal strength below a threshold value), and/or otherwise unavailable/undesirable to the UAV 105. Such situations are generally unanticipated/unexpected by the network management system 135 at the time of generating the flight plan.

In addition, the flight rules may be utilized to address situations that may cause the UAV 105 to deviate from the flight route and/or the listing of base stations. In this regard, the flight rules may be indicative of autonomy allowed for the UAV 105 during flight using the flight plan. As an example, a flight rule(s) may indicate how much the UAV 105 may deviate from the flight route without requesting authorization from the network management system 135 to effectuate the deviation. For instance, the flight route may be provided as a volume in three-dimensions (e.g., range of longitude, latitude, and altitude) within which the UAV 105 may traverse and be considered within bounds of the flight route. The deviation may be provided in terms of a distance from a boundary of the flight route. The amount of deviation may be set based on, for example, density of traffic (e.g., ground traffic and/or air traffic), density of structures (e.g., buildings, trees), density of population associated with the geographic region (or portion thereof) of the flight route. Different portions of the route may be associated with a different amount of deviation. In some cases, the deviation may be set to zero (e.g., no allowed deviation).

In some cases, when the UAV 105 plans to fly (e.g., is about to fly) out of bounds but stay within the allowed deviation, such as to avoid another UAV or other obstacle, the flight rule may indicate that the UAV 105 needs to report to the network management system 135 the deviation from the flight route but can fly in the out of bounds region. The UAV 105 may also report the reason for the deviation, such as identifying the position of the obstacle and the type of obstacle (e.g., building, UAV, etc.) When the UAV 105 plans to fly outside of the allowed deviation, the flight rule may indicate that the UAV 105 may proceed with flying outside of the allowed deviation only to avoid an obstacle (e.g., avoid collision, avoid no-fly zone) or only after requesting and receiving authorization from the network management system 135. In this example, the UAV 105 may maneuver itself to avoid an obstacle without authorization (e.g., including in cases in which authorization is requested but not received in time), and report the situation to the network management system 135 after the maneuver has been performed.

As another example, the flight rule may associate different priority levels with different base stations. For instance, consider that each base station may be associated with a priority level of 1 to 4, with 1 being the lowest priority level and 4 being the highest priority level. In general, the UAV 105 may prioritize connecting to base stations with higher priority levels and consider base stations with lower priority levels when base stations with higher priority levels have been determined to be obstructed, associated with a low signal strength (e.g., signal strength below a threshold value), and/or otherwise unavailable/undesirable to the UAV 105.

In some aspects, the listing of base stations may include preferred base stations associated with a priority level of 4. In some cases, the listing of base stations may include additional base stations associated with a priority level of 3. The flight rules may also identify other base stations (and positions and priority levels thereof), which are considered to not be on the listing of base stations (e.g., base stations not referenced as preferable). The flight rules may indicate that, when the UAV 105 is planning to connect to base stations with priority levels of 1 or 2, the UAV 105 needs to request and receive authorization from the network management system 135. In some cases, handling flight rules associated with deviating from the flight route may coincide with handling flight rules associated with connecting to base stations not on the listing, as deviating from the flight route may lead to connection to base stations not on the listing.

In some aspects, the UAV 105 may utilize the priority levels when handling connection-based events such as link loss and/or inability to connect to base stations on the listing (e.g., priority level 3 or 4). The link loss may be a loss in connection between the UAV 105 and a base station on the listing or a loss in connection between the UAV 105 and a base station not on the listing. In either connection-based event, the flight rules may indicate that, to potentially improve reception of signals from at least one base station (e.g., on the listing or not on the listing), the UAV 105 may position itself such that it is at least a certain distance away from obstructions and/or position itself at an altitude or within a range of altitudes (e.g., within constraints of any regulations), e.g. even in cases that such positioning causes the UAV 105 to deviate from the flight route and/or other flight rules. In some cases, the UAV 105 may leverage onboard sensors and any available geographic information to facilitate safely implementing such positioning. In some cases, since the UAV 105 does not have connectivity (e.g., reliable connectivity), the UAV 105 may perform maneuvers to effectuate such positioning without authorization, and report the event and deviations from the flight plan once the UAV 105 is able to connect to a base station.

The flight rules may indicate that the UAV 105 may point the directional antenna 115 at base stations provided to the UAV 105 and/or switch to the omnidirectional antenna 110 to facilitate scanning for base stations. The flight rules may indicate that the UAV 105 point at base stations in an order based on, for example, distance between the UAV 105 and the base stations, priority level of the base stations, geographic information (e.g., obstacle, weather, air traffic, emergency broadcast) between and around the UAV 105 and the base stations, and/or other factors. In some cases, the flight rules may provide the order to the UAV 105. The flight rules may indicate that the UAV 105 may connect to a base station from which signals are received at a certain threshold or level to establish and maintain connection, e.g. a first base station (e.g., among base stations already scanned for) from which the UAV 105 is able to receive signals at a certain threshold or level.

In some cases, the operator may allow (e.g., may set) the UAV 105 to determine characteristics associated with the base station connected to by the UAV 105, such as a position (e.g., longitude, latitude, altitude) of the base station, a channel (e.g., frequency band) of the base station, signal strength of the signal, and/or other characteristics associated with the base station and/or signal transmitted by the base station. The UAV 105 may provide the determined characteristics to the network management system 135. The UAV 105 may also provide a position, heading, and/or speed of the UAV 105, direction pointed at by the directional antenna 115, and/or other characteristics of the UAV 105 when the signal from the base station was received. The network management system 135 may utilize such information from the UAV 105 (and/or other UAVs) to generate flight plans (e.g., flight route and/or flight rules) that avoid and/or help handle connection-based events (e.g., around the location at which the UAV 105 experienced the connection-based event (s) in this example).

In an embodiment, the network management system 135 may adjust the flight plan, including the flight route and/or the flight rules, while the UAV 105 is flying over the pre-programmed flight plan or over a previously adjusted flight plan (e.g., the pre-programmed flight plan has previously been adjusted). In this regard, the pre-programmed flight plan may refer to the flight plan provided to the UAV 105 prior to any adjustments by the network management system 135.

In some cases, the network management system 135 may adjust the flight plan based on information provided by the operator of the UAV 105 (e.g., via the user device 120). As an example, the operator may adjust a destination point from the destination point 140B to another destination point while the UAV 105 is flying. As another example, the adjustment may be in response to a request for authorization from the UAV 105 to adjust the flight plan. The UAV 105 may propose the manner by which to adjust the flight plan.

Alternatively or in addition, the network management system 135 may adjust the flight plan based on changes in geographic information (e.g., obstacle information, weather information, traffic information, emergency broadcast information). As an example, the network management system 135 may receive information (e.g., from local authorities) of a newly implemented temporary no-fly zone. The network management system 135 may update the flight plan information for the UAV 105 to reflect the new no-fly zone and/or may update the geographic information to reflect the new no-fly zone. As another example, the network management system 135 may receive information from the UAV 105 and/or other UAVs indicating the unavailability of a base station (e.g., antenna of the base station is malfunctioning or broken), and the network management system 135 may update flight plans to reflect this change (e.g., direct the UAVs to one or more other base stations to connect to while flying their respective flight routes) and factor in the unavailability of the base station when generating new flight plans.

In this regard, the network management system 135 may transmit messages (e.g., over the cellular network) to the UAV 105 to adjust the flight plan of the UAV 105 based on information provided by the operator of the UAV 105 (e.g., via the user device 120) and/or based on changes in geographic information associated with the geographic region. In some cases, the network management system 135 may adjust the flight plan of the UAV 105 multiple times during flight of the UAV 105. In an embodiment, the network management system 135 may store the pre-programmed flight plans and adjusted flight plans, analyze the adjustments made (e.g., determine traffic statistics), and generate future flight plans based on the analysis.

In some aspects, the operator of the UAV 105 and/or user device 120 may generate a flight plan, via an interface, such as a user interface provided by a website and/or application program, and provide the generated flight plan to the network management system 135 for authorization. The website and/or application program may be provided by one or more mobile network operators and/or another party to facilitate flight plan generation and management. In an aspect, the operator may be provided with a list of base stations, from which the operator may manually generate the flight route and/or select the base stations to be connected to during flight of the UAV 105. In response to receiving the operator's proposed flight plan, the network management system 135 may provide authorization for the operator's proposed flight plan, provide authorization for an adjusted version of the operator's proposed flight plan (e.g., adding flight rules to be implemented), and/or provide authorization for one or more alternative flight plans (e.g., flight plans preferred by the network management system 135).

The interface may facilitate generation of the flight plan by the operator, and the operator may provide information on some or all fields (e.g., of a form) pertaining to the flight plan (e.g., starting point, destination point, departure and arrival time, purpose of the flight). The network management system 135 may identify any fields not filled in by the operator as the operator having no preference or attributing a lowest importance/priority to the field, such as when the operator does not specify a departure time and an arrival time. The network management system 135 may generate one or more potential flight plans based on information provided and information not provided by the operator. An operator of the UAV 105 and/or user device 120 may confirm the flight plan to be utilized or propose adjustments to any adjustments made by the network management system 135.

Thus, using various embodiments, the network management system 135 may generate flight plans and/or adjust flight plans received from operators (e.g., flight plans proposed by the operators) of UAVs. By centralizing the generation and management of the flight plans, the flight plans can be coordinated to allow air traffic to be better distributed throughout the airspace (e.g., to reduce traffic congestion and/or collisions) and/or to allow wireless traffic to be better distributed (e.g., to reduce overloading of some base stations and underutilization of other base stations), thus facilitating efficient use of the airspace and the network.

By defining the flight routes, the preferred base stations for the flight routes, start and/or end times of the flight routes, and/or other parameters associated with facilitating flight from a starting point to a destination point, a large density of UAVs may simultaneously fly in the airspace.

In some embodiments, the flight routes may be represented as and/or provided to the UAVs as blocks of a three-dimensional grid. In this regard, the network management system 135 may divide the geographic region into blocks of a three-dimensional grid. In some cases, such quantization/discretization of the geographic region may facilitate (e.g., reduce computational resources, time, power for) implementation, generation, and management of the flight plans, e.g. relative to a continuous three-dimensional space. For instance, a geographic location can be referenced by an identifier associated with the block, rather than provided as ranges along three dimensions. The three-dimensional grid may be provided with an x-axis, a y-axis, and a z-axis.

Each block of the grid may represent a range along an x-axis (e.g., longitude range), a y-axis (e.g., a latitude range), and a z-axis (e.g., altitude range). For example, each block may be a parallelepiped (e.g., cube, rectangular cuboid) or other three-dimensional shape. The three-dimensional grid may be defined by blocks of different shapes and/or sizes. In some aspects, the same three-dimensional grid or portions thereof may be utilized by the UAVs that receive flight plans from the network management system 135. For example, a block identified as block A for the UAV 105 represents the same geographic location as a block identified as block A for another UAV.

In an aspect, the network management system 135 may set the shape(s) and/or size(s) of the blocks based on, for example, a size (e.g., maximum or average size) of UAVs that generally fly in each block, density of air traffic, time associated with flying over the flight route, and/or other characteristics. Blocks of smaller sizes may be utilized to represent portions of the geographic area to more precisely control flight of UAVs in these blocks. In some cases, the UAVs may fly with autonomy within each block, e.g. using their onboard sensors and/or available geographic information. In regions with high density, each block may be set to be around the maximum size of the UAVs such that there may be minimal or no room within each block for the UAVs to traverse. In this regard, the UAVs may traverse from block to block with minimal navigation options within each block.

In an aspect, the network management system 135 may associate information with each block. In this regard, the network management system 135 may associate location information (e.g., latitude range, longitude range, altitude range), obstacle information, weather information, emergency information, and/or other information related to each block. For example, the obstacle information may identify obstacles in each block. A larger obstacle, such as a building, may encompass a larger number of blocks than a smaller obstacle, such as a base station tower.

In an aspect, for a flight route, the network management system 135 may classify the block of the grid (or portion thereof) into one or more sets, with each set being associated with a respective priority level. As an example, consider that each set of blocks is associated with a priority level of 1 to 4, with 1 being the lowest priority level and 4 being the highest priority level. In this regard, the UAV 105 may prioritize traversing blocks of higher priority level and consider traversing blocks of lower priority level when blocks of higher priority levels are obstructed (e.g., by a newly defined no-fly zone) or otherwise unavailable/undesirable to the UAV 105.

A first set of blocks (associated with a priority level of 4) may define a preferred flight route to be traversed by the UAV 105. A second set of blocks (associated with a priority level of 3) may define blocks in the vicinity of the blocks in the first set that the UAV 105 may traverse when appropriate, such as to avoid an obstacle that impedes the flight route. For instance, obstacles may include UAVs, buildings, trees, blimps, birds, etc. not identified in the grid and/or not identified at the correct block in the grid. The obstacles may be detected using onboard sensors of the UAV 105. The flight rules may indicate that the UAV 105 may traverse blocks of the second set without requesting authorization from the network management system 135, but need to report to the network management system 135 which blocks of the second set were traversed and/or the reason for deviating from the preferred flight route.

A third set of blocks (associated with a priority level of 2) may define additional blocks that the UAV 105 may traverse only after requesting and receiving authorization from the network management system 135. In this regard, the UAV 105 may determine that the UAV 105 may need to traverse one or more blocks in the third set of blocks, identify the block(s) that may be traversed, and transmit a request to the network management system 135 for authorization to traverse the identified block(s). In some cases, the UAV 105 may make the request to address unanticipated air traffic, such as to meet a deadline. If authorization is received to traverse the blocks, the UAV 105 may traverse, but need not traverse, the blocks.

A fourth set of blocks (associated with a priority level of 1) may define additional blocks that the UAV 105 cannot traverse. In this regard, the UAV 105 that is in compliance with the flight rule(s) does not request authorization to traverse these blocks. The fourth set of blocks may coincide with FAA requirements and/or other requirements, such as temporary flight restrictions (e.g., temporary event such as wildfire or security-related event, stadiums/sporting events), restricted airspace, airport-related restrictions, local flight ordinances, and/or others. In some cases, a flight rule may indicate that any blocks not explicitly associated with a priority level is to be assumed to have a priority level of 1.

A flight rule may indicate that, for all blocks regardless of priority level, the UAV 105 may perform maneuvers that cause it to traverse these blocks to avoid collision (e.g., with structures and/or aerial devices/vehicles) and/or minimize damage associated with a collision. The flight rule may indicate that any such maneuvers, even those performed completely within blocks of priority level 4, need to be reported to the network management system 135.

In an embodiment, the network management system 135 may utilize any information provided in the reports from the UAV 105 to adjust future flight plans and/or information (e.g., obstacle, weather, traffic, and/or emergency broadcast information) associated with the geographic region. For example, if a certain block is associated with a large number of collisions, the network management system 135 may decrease traffic in the block, such as by including the block in fewer flight routes and/or associating the block with lower priority in flight plans.

Figure 5:
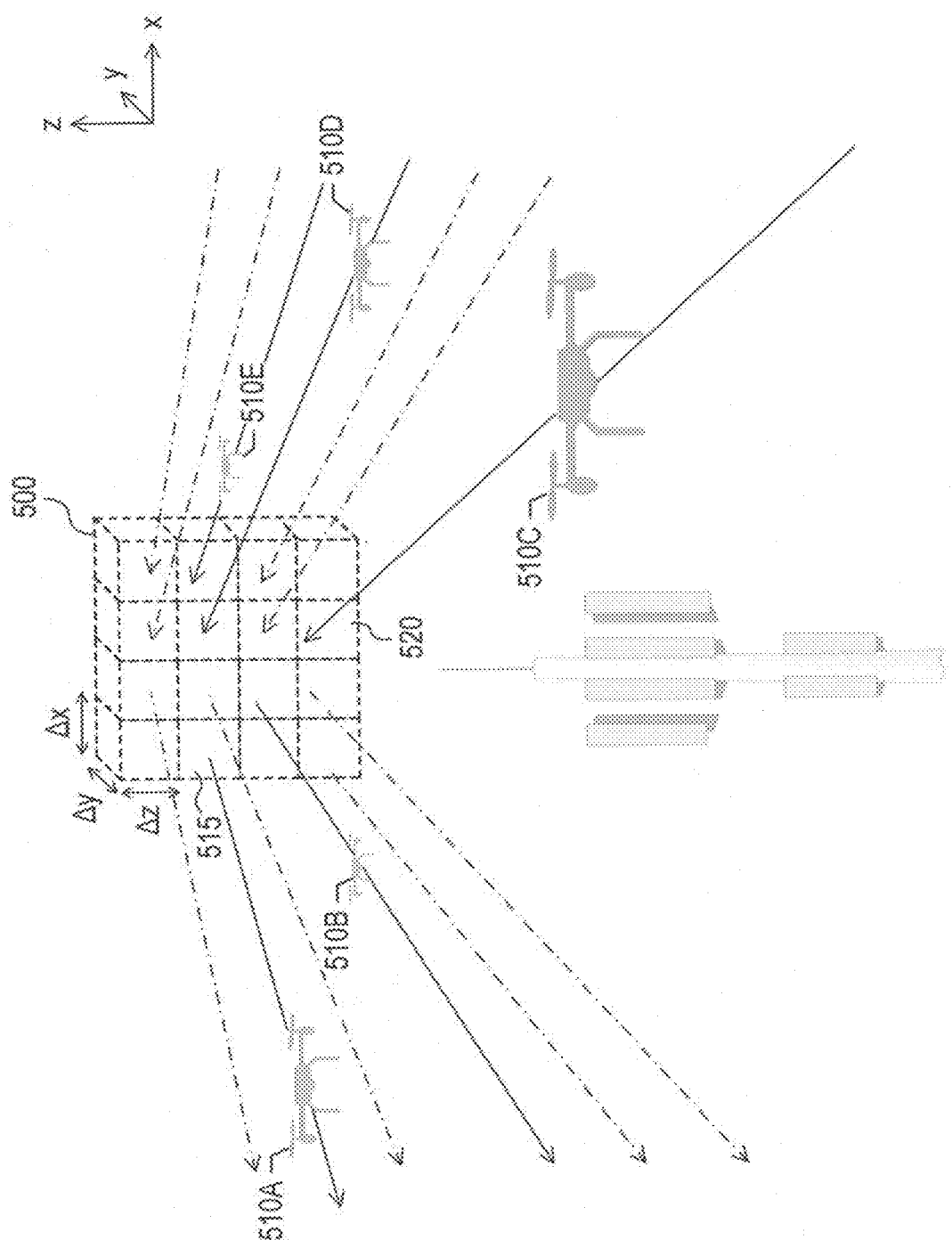
FIG. 5 illustrates an example of a grid for facilitating flight plan implementation, generation, and management in accordance with one or more embodiments of the present disclosure.

FIG. 5 illustrates an example of a grid 500 for facilitating flight plan implementation, generation, and management in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 5.

An x-axis of the grid 500 may be indicative of an east-west direction (e.g., longitude direction). A y-axis of the grid 500 may be indicative of a north-south direction (e.g., latitude direction). A z-axis of the grid 500 may be indicative of altitude. In an aspect, to define the grid, for rectangular blocks, the blocks of the grid may be defined by $\Delta x$, $\Delta y$, $\Delta z$, and a reference position of the block (e.g., a specific corner). In another aspect, to define the grid, the position of one or more corners of each block may be provided. Other manners/formats by which UAVs 510A-E may be provided with the blocks to be traversed may be utilized. As an example, blocks 515 and 520 of the grid 500 are labeled. The UAV 510A has traversed through the block 515. The UAV 510C is intended to traverse through the block 520.

Although FIG. 5 illustrates an example in which the UAVs 510A-E travel at a constant altitude, in some cases the altitude at which one or more of the UAVs 510A-E travel during the course of a flight path may be non-constant. In addition, although FIG. 5 provides an example in which the blocks of the grid are identical in shape and size, the shape and/or size of different blocks of a grid may be different.

Figure 6:
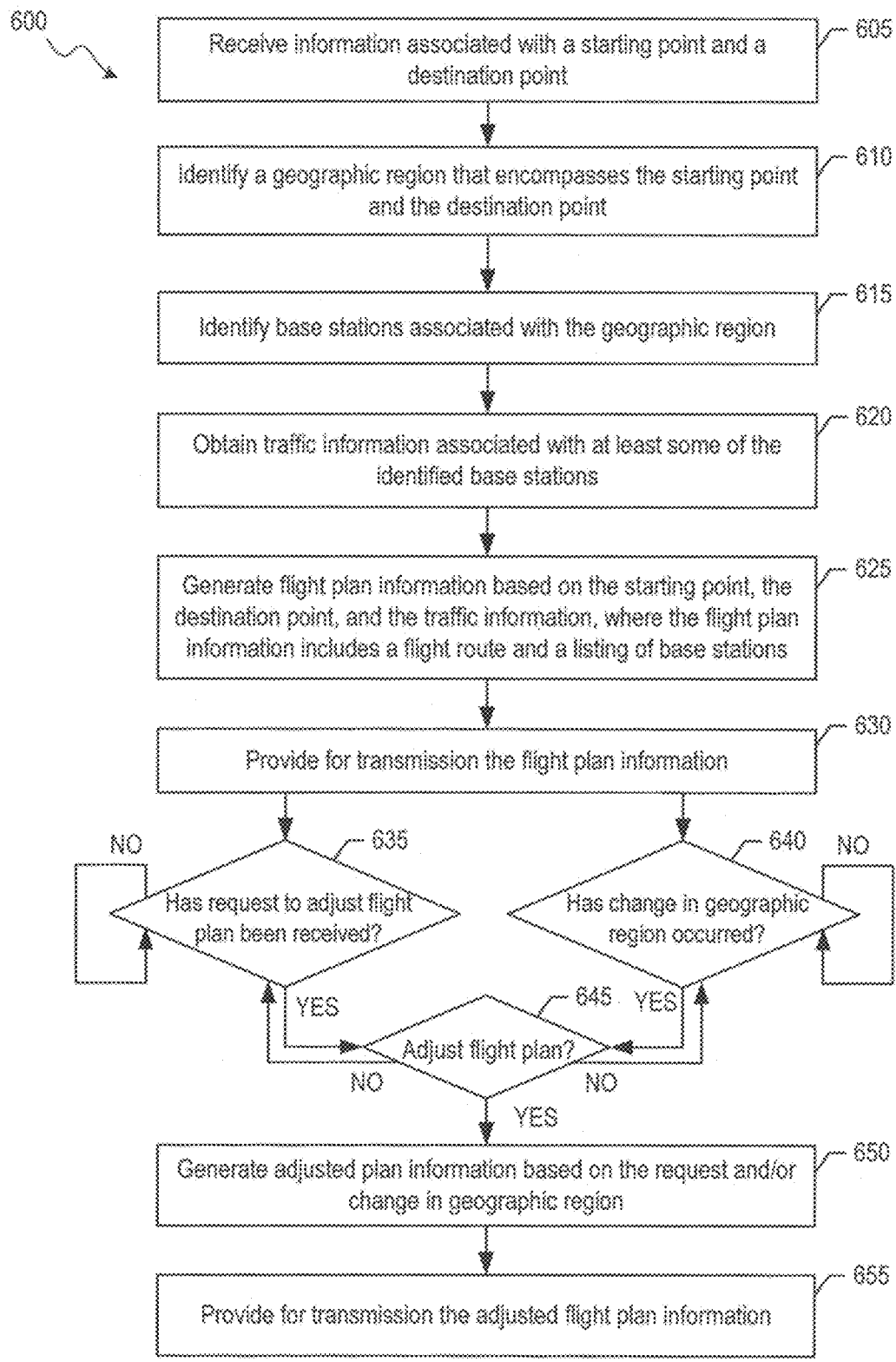
FIG. 6 illustrates a flow diagram of an example process for facilitating generation and management of flight plans in accordance with one or more embodiments of the present disclosure.

FIG. 6 illustrates a flow diagram of an example process 600 for facilitating generation and management of flight plans in accordance with one or more embodiments of the present disclosure. For explanatory purposes, the example process 600 is described herein with reference to the example network environment 100 of FIG. 1; however, the example process 600 is not limited to the example network environment 100 of FIG. 1. For example, the example process 600 may be with reference to one or more UEs (e.g., UAVs) and/or one or more base stations not shown in FIG. 1. In this regard, for explanatory purposes, in an aspect, the example process 600 is performed by the network management system 135. In another aspect, the example process 600, or portions thereof, may be performed by the UAV 105, user device 120, and/or network management system 135. Note that one or more operations may be combined, omitted, and/or performed in a different order as desired.

At block 605, the network management system 135 receives information associated with (e.g., indicative of) a starting point (e.g., 140A) and a destination point (e.g., 140B). For example, the network management system 135 may receive the starting point and the destination point from the UAV 105 and/or the user device 120. At block 610, the network management system 135 identifies a geographic region that encompasses the starting point and the destination point. At block 615, the network management system 135 identifies base stations associated with the geographic region. In this regard, in an aspect, the network management system 135 may have, or may have access to, information identifying the base stations in the geographic region. The identified base stations may include the base stations 125A-E and/or other base stations not shown in FIG. 1.

At block 620, the network management system 135 obtains traffic information associated with at least some of the identified base stations. In some cases, the network management system 135 may access information associated with identified base stations. The information may be, may include, or may be derived to obtain, traffic information associated with the identified base stations. The traffic information may include utilization/occupancy of the identified base stations, utilization of the base stations in other flight plans, other traffic statistics, and/or other information associated with physical traffic (e.g., ground-based or flight altitude traffic) and/or cellular traffic. The traffic information may include cellular traffic UEs at or near ground level.

At block 625, the network management system 135 generates flight plan information based on the starting point, the destination point, and the traffic information associated with the identified base stations. The flight plan information may include a flight route and a listing of base stations. The listing of base stations may include preferred base stations to be utilized in the flight route. In some cases, the listing may include additional base stations aside from the preferred base stations.

At block 630, the network management system 135 provides the flight plan information for transmission. For example, the network management system 135 may transmit the flight plan information in one or more messages to the UAV 105 and/or the user device 120. As another example, the network management system 135 may allow the UAV 105 and/or the user device 120 to retrieve the generated flight plan information, e.g. stored locally at the network management system 135 and/or at a remote memory (e.g., memory of a remote server) associated with the network management system 135. The generated flight plan information may be utilized to pre-program the flight plan into the UAV 105.

At block 635, the network management system 135 determines whether any request to change the flight plan has been received. The request may be received from the UAV 105 and/or the user device 120, e.g. prior to or during flight of the UAV 105 over the pre-programmed flight route. In some cases, the UAV 105 may generate a request for authorization to deviate from the flight route, e.g. to avoid an obstacle not identified in the geographic information provided in the flight information. The request for authorization may be generated autonomously by the UAV 105 (e.g., without input from an operator of the UAV 105), and/or may be generated by the operator. In some cases, the operator may generate a request to change the flight plan, such as a request to change the destination point.

At block 640, the network management system 135 determines whether a change has occurred in the geographic information associated with the geographic region. For example, the network management system 135 may receive information associated with a newly added no-fly zone, weather updates, and/or any obstacle unknown to or otherwise not taken into consideration by the network management system 135 when the flight plan was generated. In some cases, the change in the geographic information may be provided by the UAV 105 and/or other UAVs, such as in a request for authorization to adjust a flight plan.

At block 645, the network management system 135 determines whether to adjust the flight plan information based on block 635 and/or 640. At block 650, the network management system 135 generates adjusted flight plan information based on the request and/or change in the geographic information. At block 655, the network management system 135 provides the adjusted flight plan information for transmission. For example, when the flight plan adjustment is in response to a request from the UAV 105 for authorization to adjust the flight route, the adjusted flight plan information may include an authorization to the request and/or the adjustment to the flight plan information. In cases when the geographic information has changed, the network management system 135 may generate adjustments to multiple fight plans.

In some embodiments, to facilitate implementing of the flight plans by the UAVs and maintaining of cellular connectivity while implementing the flight plans, the network management system 135 may provide one or more identifiers to the UAVs that the UAVs. For the UAV 105, the UAV 105 may include the identifier(s) associated with the UAV 105 to identify itself to the cellular network. The identifier(s) may be utilized for authentication and/or identification purposes. In this regard, the identifier(s) may facilitate access of the UAV 105 to the base stations 125A-E and/or the network management system 135. In this manner, connectivity, handover, and secure access (e.g., allow encryption/decryption of messages) between the UAVs and various components of the cellular network may be facilitated. For example, a secure encrypted path may be maintained (e.g., not disrupted) during handover.

In some cases, one or more identifiers may be utilized to identify the UAVs in the cellular network. For the UAV 105, a device (e.g., the user device 120, the network management system 135) with knowledge of the identifier(s) of the UAV 105 may use the identifier(s) to take over and manually control the UAV 105. In some cases, each flight plan may be associated with one or more identifiers, such that the flight plan may be referenced by the UAV 105, user device 120, base stations 125A-E, network management system 135, and/or other devices.

In some embodiments, with reference to FIG. 1, beyond line of sight control may be provided by the cellular network, e.g. by way of messages transmitted (e.g., broadcasted) by the base stations 125A-E and received by the UAVs (e.g., the UAV 105) as the UAVs fly using their respective flight plans. In this regard, to facilitate flight of UAVs (e.g., the UAV 105) using their respective flight plans, the base stations 125A-E may transmit geographic information associated with the base stations 125A-E. The geographic information may include position information, obstacle information, weather information, traffic management information (e.g., air traffic management information), emergency broadcast information, and/or generally any other information that may be static or dynamic in the airspace that can be communicated to facilitate communication of the UAVs with the cellular network.

As previously indicated, in one or more aspects, the base stations 125A-E may receive at least some of the geographic information from the network management system 135. The UAVs may use the geographic information from the base stations 125A-E in addition to the geographic information provided by the network management system 135 as part of the flight plan information. In some cases, although the geographic information provided by the base stations 125A-E may be provided to the base stations 125A-E by the network management system 135, the geographic information the UAV 105 may receive from the base stations 125A-E during flight may be updated relative to the geographic information contained in the pre-programmed flight plan or adjusted flight plan provided to the UAV 105. In this regard, the UAVs may identify any discrepancies between the geographic information from the base stations 125A-E and the geographic information from the network management system 135.

The UAVs may utilize the discrepancies to determine whether to deviate from the flight plans. In this regard, the geographic information received from the base stations 125A-E (e.g., en route over the flight path) may allow the UAV 105 to determine whether to request authorization from the network management system 135 to adjust the flight plan, such as adjust the base station to point to, adjust a frequency band utilized for communication, adjust a flight route, and/or other adjustments.

In some aspects, the geographic information includes position information. The position information may include a longitude, a latitude, and an altitude of an antenna of the base station, and/or information indicative of the longitude, latitude, and altitude (e.g., information from which the UAV 105 may derive the longitude, latitude, and altitude). In some cases, rather than the longitude, latitude, and/or altitude coordinates, other coordinate systems by which to define the position of the base stations 125A-E may be utilized. In some cases, one or more of the base stations 125A-E may be mobile (e.g., mobile base stations at ground level, mobile base stations at flight altitudes, mobile naval-based base stations, etc.), in which case its position information is dynamic.

The obstacle information and weather information may identify obstacles (e.g., trees, buildings) and weather (e.g., rain, fog, hail) within coverage regions of the base stations 125A-125E, or portion thereof. For example, the base station 125A may provide position information (e.g., latitude, longitude, height) encompassed by the obstacles. The traffic management information may provide information indicative of signal strengths at different frequency bands and/or at different positions (e.g., altitudes, longitudes, and/or latitudes). In some cases, the traffic management information may provide preferred frequency bands at different altitudes. Alternatively or in addition, the traffic management information may identify neighbors associated with the base station 125A, such as in a neighbor list(s). In an aspect, the neighbor list(s), signal strength statistics, preferred frequency bands, and/or preferred altitudes may be part of the geographic information (e.g., part of the traffic management information) transmitted by the base stations 125A-E to the UAV 105. The emergency broadcast information may identify traffic incidences and/or no-fly zones (e.g., temporary no-fly zones due to these traffic incidences).

In some cases, the geographic information from the base station 125A may include an indication (e.g., a pointer) to a data channel (e.g., a streaming data channel) to which the UAVs can tune to receive additional and/or more detailed information (e.g., obstacle, weather, traffic information, emergency broadcast information). The data channel may be a website, broadcast channel, and/or other communication avenues by which to provide additional and/or more detailed information. The indication may be, or may include, a uniform resource locator (URL) associated with a website, a frequency band associated with a broadcast channel (e.g., an LTE broadcast channel), and/or generally any manner by which to indicate/identify a data channel that can provide additional and/or more detailed information. The UAV 105 may access the data channel based on the indication, e.g. the URL and/or frequency band provided as, or as part of, the indication. The website and/or broadcast channel may be provided by the mobile network operator and/or by another party (e.g., a dedicated weather broadcast channel), and may be publicly accessible or accessible via subscription. In some cases, the UAV 105 may access the data channel and determine whether to request authorization from the network management system 135 to adjust the flight plan based on information from the data channel.

By facilitating maintaining high signal strength connectivity, the subject technology may further facilitate the operation of UAVs (e.g., the UAV 105) beyond line of sight of an operator(s) of the UAVs. For example, the higher signal strengths that may be effectuated through the use of the directional antenna 115 may help ensure that the UAV 105 can maintain connectivity (or a threshold level of connectivity) while implementing the flight plan. Furthermore, with better reception facilitated by the use of the directional antenna 115, power dissipation of the UAV 105 associated communicating with one or more of the base stations 125A-E may be reduced. In this regard, the UAV 105 may be able to fly for a longer distance/duration before needing to be recharged, and/or may make fewer or no intermediary stops (e.g., at UAV power docking stations) between a starting point and a destination point.

In an aspect, the geographic information may be accessible to and usable by all UEs within range of the base stations 125A-E. In another aspect, the geographic information transmitted (e.g., broadcasted) by the base stations 125A-E is encrypted and available to authenticated and/or subscribed UEs only. In some cases, some information may be accessible to and usable by any UEs that receive them, while other information may be available (e.g., decodable) by subscribed UEs only. In an aspect, unsubscribed UEs may be allowed access to (e.g., allowed to decode) encrypted geographic information (e.g., for a fee).

In an aspect, the geographic information may be provided as part a broadcast message. For example, the geographic information may be included in a master information block (MIB) message, system information block (SIB) message, Multimedia Broadcast Multicast Services (MBMS)-based message, Evolved MBMS (eMBMS)-based message, and/or generally any message that can be transmitted (e.g., broadcasted) by the base stations of the cellular network and received by UEs that are within receiving range of the messages.

As an example, the position information may be included in an MIB message or an SIB message. The SIB message may be one of many different types. In an aspect of LTE, a system frame number (SFN) may be a value between 0 and 1023, inclusive, with the value 1023 going back to the value 0 when incremented. The SFN may be utilized as a timing reference by devices (e.g., the UAV 105) that receive broadcast messages from a base station (e.g., the base station 125A). A broadcast message associated with an SFN of n may be denoted as having an SFN n. A time between transmission of messages associated with any two adjacent SFNs (e.g., a time between SFN1 and SFN2, a time between SFN 894 and SFN 895) may be fixed at 10 ms. The MIB message and the different types of SIB messages may be generated and/or transmitted (e.g., broadcasted) at different times (e.g., represented in terms of SFN) and/or with different periodicity. An example of a timeline associated with transmission of MIB messages and SIB type 1 messages is described with respect to FIGS. 7 and 8, respectively.

Figure 7:
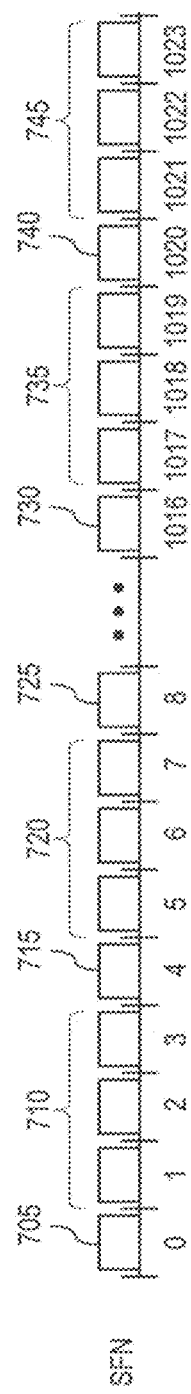
FIG. 7 illustrates an example of a timeline associated with transmission of master information block messages.

An MIB message includes information needed for the UAV 105 to acquire other information from a base station (e.g., the base station 125A). The MIB message may include carrier bandwidth and a current SFN. In an aspect, the MIB message may be utilized to include the position information of the base station. A new MIB message is generated and transmitted every four SFNs (e.g., every 40 ms), starting at SFN 0. With reference to FIG. 7, a new MIB message (e.g., 705, 715, 725, 730, 740) is transmitted by the base station at SFN 0, SFN 4, SFN 8 . . . SFN 1016, SFN 1020, with the ellipses representing intervening SFNs. In this regard, the periodicity of the new MIB message is 4. Between two new MIB messages, the earlier of the two new MIB messages is copied and transmitted by the base station. For example, MIB messages 710 are the same as the MIB message 705, MIB messages 720 are the same as the MIB message 715, MIB messages 735 are the same as the MIB message 730, and MIB messages 745 are the same as the MIB message 740.

Figure 8:
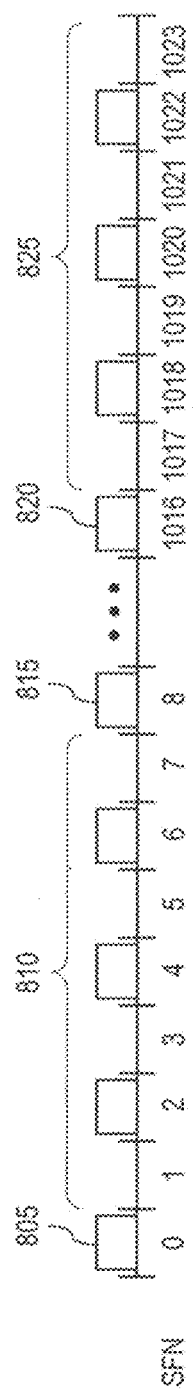
FIG. 8 illustrates an example of a timeline associated with transmission of system information block type 1 messages.

An SIB type 1 message, generally denoted as SIB1 message or SIB-1 message, may include information (e.g., access parameters) the UAV 105 needs to determine whether the UAV 105 is allowed access to the base station, and also may include information regarding the scheduling of system information blocks of other types. In this regard, the SIB1 message provides information indicative of which types of SIB messages are to be sent at which SFNs. A new SIB1 message is generated and transmitted every eight SFNs (e.g., every 80 ms), starting at SFN 0. With reference to FIG. 8, a new SIB1 message (e.g., 805, 815, 820) is transmitted at SFN 0, SFN 8 . . . SFN 1016, with the ellipses representing intervening SFNs. In this regard, the periodicity of the new MIB message is 8. Between two new SIB1 messages, the earlier of the two new SIB1 messages is copied and transmitted every other SFN (e.g., at SFN2, SFN4, and SFN6). For example, SIB1 messages 810 transmitted at SFN 2, 4, and 6 are the same as the SIB1 message 805 transmitted at SFN 0, and SIB1 messages 825 transmitted at SFN 1018, 1020, and 1022 are the same as the SIB1 message 820 transmitted at SFN 1016.

An SIB type 2 message, generally denoted as SIB2 message or SIB-2 message, may include configuration information common to all UEs accessing the base station 125A. The scheduling of the SIB2 message may be based on the information provided in an SIB1 message. Other types of SIB messages are provided in the 3GPP standard. In an embodiment, an MIB message, SIB1 message, and/or other type of SIB message may include the position information of the base station. For example, the SIB message may be of a type that allocates (e.g., dedicates) at least a portion of its message size (e.g., in bits) to information utilized for facilitating communication of devices at higher altitudes (e.g., the UAV 105) with the cellular network via the base station, such as the position information of the base station.

In an aspect, the position information may be provided in a type of SIB message that contains information dedicated to facilitating connectivity for aerial vehicles and devices operating at higher altitudes. Devices or vehicles that may not benefit from the information in such a type of SIB message, such as devices or vehicles at or near ground level, may disregard or ignore (e.g., not listen for) the SIB message.

Different parts of the geographic information may be sent at different times and/or with different periodicity. In an aspect, the different parts of the geographic information may be sent in different broadcast messages, e.g. in the MIB message or different types of SIB messages. For example, the position information and the emergency broadcast information may be sent more frequently than other information, such as in the MIB message and/or SIB1 message.

In an embodiment, the UAV 105 may receive information (e.g., geographic information) from non-network devices (also referred to as non-network nodes). In this regard, the base stations 125A-E and network management system 135 may be referred to as network devices or network nodes of the cellular network. In some cases, a non-network device may provide one-way communication from the non-network device to the UAV 105. A non-network device may be placed at locations at or near an obstacle for example, and broadcast (e.g., using its antenna(s)) its position information and/or other geographic information to help prevent collision of the UAV 105 and/or other UEs/UAVs with the obstacle. As an example, the non-network device may be placed at or near a tall tree. As another example, the non-network device may be placed at a location designated as a no-fly zone and utilized as a no-fly zone beacon. For instance, a traffic accident (e.g., whether between two cars at ground level, two UAVs, a car and a building, and so forth) may cause emergency helicopters and/or other aircrafts to deployed in and/or around the no-fly zone. The UAV 105 may impede emergency response if flown in or around the no-fly zone.

Although in one or more embodiments the UAV 105 may autonomously perform various actions, such as configuring the directional antenna 115 based on position information, in some cases the UAV 105 may be remotely controlled. In some cases, manual adjustment of the UAV 105 may be employed, such as for safety issues (e.g., preventing an accident or collision). Within the line of sight, the user device 120 may manually adjust flight of the UAV 105 by communicating directly with the UAV 105. Beyond the line of sight, in an embodiment, the user device 120 may transmit control commands to the UAV 105 via one or more of the base stations 125A-E and/or the network management system 135. In some cases, the base stations 125A-E, network management system 135, and/or other devices (e.g., associated with the mobile network operator) may control the UAV 105. For example, the network management system 135 may have knowledge of one or more identifiers associated with the UAV 105 (e.g., for identifying the UAV 105 in the cellular network), and/or the UAV 105 may allow devices with knowledge of the identifier(s) to control the UAV 105. An operator (e.g., a person) may be able to directly see the UAV 105 (e.g., both within and beyond the line of sight provided by the user device 120) and/or may be able to monitor the UAV 105 and/or its surrounding (e.g., using cameras of the UAV 105). In an aspect, at any point of a flight path, the user device 120, base stations 125A-E, and/or network management system 135 may cause adjustment of the flight path. In some cases, the UAV 105 may be set to request authorization, such as from the user device 120 and/or network management system 135, to perform certain actions. The UAV 105 may perform the actions once authorization is received.

Figure 9:
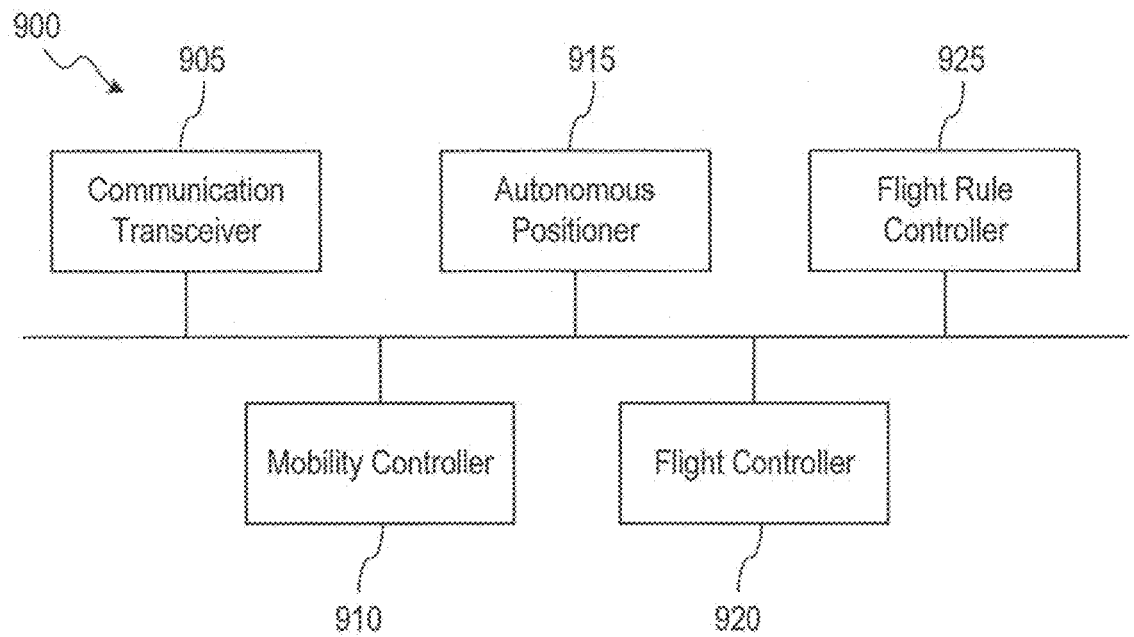
FIG. 9 illustrates a block diagram of an example of a UAV processing unit in accordance with one or more embodiments of the present disclosure.

FIG. 9 illustrates a block diagram of an example of a UAV processing unit 900 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the UAV processing unit 900 is described herein with reference to the example network environment 100 of FIG. 1; however, the UAV processing unit 900 is not limited to the example network environment 100 of FIG. 1. In an aspect, the UAV 105 includes the UAV processing unit 900.

The UAV processing unit 900 may include a communication transceiver 905, a mobility controller 910, an autonomous positioner 915, a flight controller 920, and a flight rule controller 925. The communication transceiver 905 may implement appropriate physical layer(s) and protocol stack (s) to enable communication between the UAV 105 and the user device 120, base stations 125A-E, and/or network management system 135. For example, the communication transceiver 905 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. The communication transceiver 905 may allow the UAV 105 to transmit messages to and/or receive messages from the user device 120, base stations 125A-E, and/or the network management system 135 via the omnidirectional antenna 110 and/or the directional antenna 115.

The mobility controller 910 may implement any control and feedback operations appropriate for interacting with the avionics, control actuators, and/or other equipment included in the flight control unit to fly the UAV 105, including, but not limited to, taking off, landing, and/or setting/adjusting direction, velocity, and/or acceleration of the UAV 105. In some cases, the mobility controller 910 may receive commands from the user device 120, base stations 125A-E, and/or network management system 135, to, for example, configure a flight plan (e.g., program a flight plan), adjust a programmed flight path, deploy the UAV 105, land the UAV 105, navigate the UAV 105, and/or other commands that facilitate navigating the UAV 105 and utilizing the UAV 105 to perform an action. In some cases, the mobility controller 910 may receive commands to move and/or rotate the UAV 105 and/or component thereof (e.g., the directional antenna 115).

The autonomous positioner 915 may be utilized to monitor (e.g., autonomously monitor) a current position of the UAV 105. The autonomous positioner 915 may include, or may be in communication with (e.g., via the communication transceiver 905), a GPS that provides the position of the UAV 105. In some cases, the autonomous positioner 915 may implement location determination techniques. In an aspect, the autonomous positioner 915 may determine a positional difference between the UAV 105 and a base station (e.g., the base station 125A) based on the position information of the UAV 105 and the base station. For example, the autonomous positioner 915 may generate signals (e.g., for the mobility controller 910) that cause rotation and/or movement of the directional antenna 115.

The flight controller 920 may be utilized to identify the current position of the UAV 105 (e.g., provided by the autonomous positioner 915) relative to positions in a pre-programmed flight route. The flight controller 920 may receive and process information from onboard sensors, base stations 125A-E, network management system 135, and/or other devices to determine whether to maintain the UAV 105 on the pre-programmed flight route or to deviate from the pre-programmed flight route (e.g., to avoid a collision). In an aspect, the flight controller 920 may have information relating to the blocks that form the three-dimensional grid (e.g., 500 in FIG. 5). The flight controller 920 may generate control signals that cause the mobility controller 910 to fly the UAV 105 along a route specified by the control signals, which may or may not differ from the pre-programmed flight route, and/or control signals that cause movement and/or rotation of the UAV 105 and/or component thereof (e.g., the directional antenna 115).

The flight rule controller 925 may be utilized to evaluate actions of the UAV 105 in view of the flight rules. In this regard, the flight rule controller 925 may evaluate control signals generated by the flight controller 920 and determine whether there are flight rules pertaining to actions associated with the evaluated control signals. For example, when the flight controller 920 generates control signals for the mobility controller 910 to deviate from the pre-programmed flight route, the flight rule controller 925 may determine whether there are flight rules associated with such a deviation. A flight rule may indicate that authorization the network management system 135 is needed unless collision is imminent. In this regard, the flight rule controller 925 may generate control signals to cause the communication transceiver 905 to transmit a request for authorization to deviate from the pre-programmed flight route. In some cases, the request may include a proposed course of action.

The flight rule controller 925 may process the authorization from the network management system 135 upon receipt and allow the control signals of the flight controller 920 to cause the mobility controller 910 to effectuate the flight. When authorization is rejected (such as when the request is to expedite traversing the flight route rather than avoid a collision), the flight rule controller 925 may cause the flight controller 920 to determine whether other actions may need to be performed. When collision is imminent, the flight rule controller 925 may allow the control signals of the flight controller 920 to cause the mobility controller 910 to effectuate maneuvers to avoid a collision. The communication transceiver 905 may report to the network management system 135, e.g. after the maneuvers have been effectuated.

Figure 10:
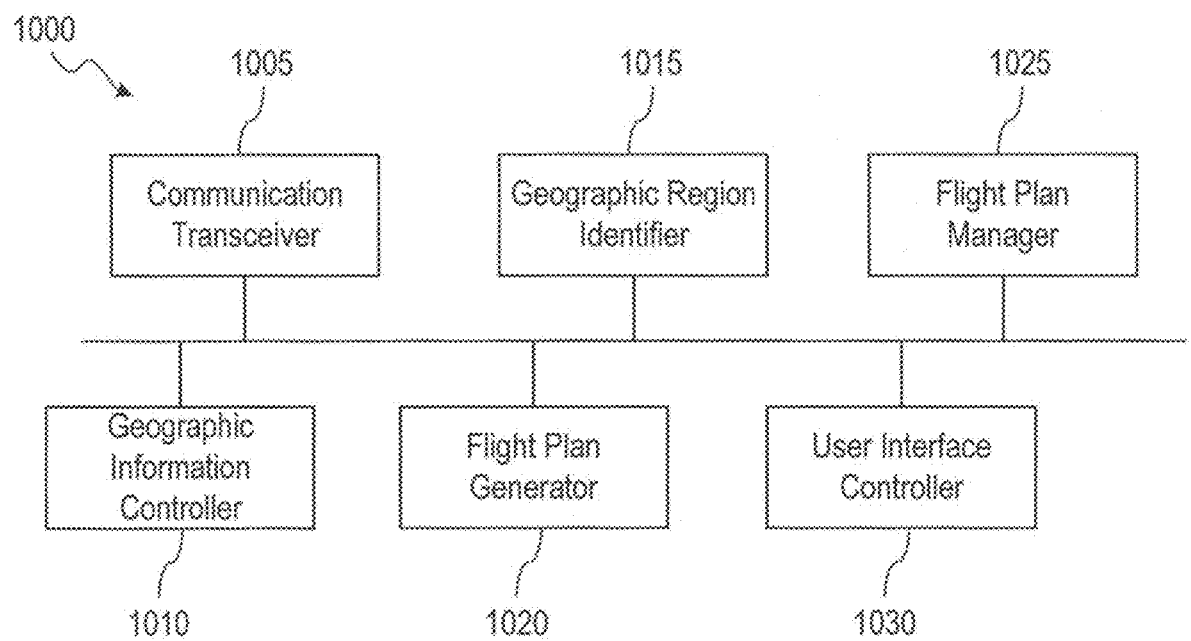
FIG. 10 illustrates a block diagram of an example of a flight plan processing unit in accordance with one or more embodiments of the present disclosure.

FIG. 10 illustrates a block diagram of an example of a flight plan processing unit 1000 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the flight plan processing unit 1000 is described herein with reference to the example network environment 100 of FIG. 1; however, the flight plan processing unit 1000 is not limited to the example network environment 100 of FIG. 1. In an aspect, the network management system 135 may include the flight plan processing unit 1000, or components thereof.

The flight plan processing unit 1000 may include a communication transceiver 1005, a geographic information controller 1010, a geographic region identifier 1015, a flight plan generator 1020, a flight plan manager 1025, and a user interface (UI) controller 1030. The communication transceiver 1005 may implement appropriate physical layer(s) and protocol stack(s) to enable communication between the network management system 135 and the UAV 105. The communication transceiver 1005 may allow the network management system 135 to transmit messages to and/or receive messages from the UAV 105 (e.g., directly or indirectly).

The geographic information controller 1010 may be utilized to retrieve and process geographic information associated with a geographic region encompassing a starting point and a destination point provided by an operator. The geographic information may include obstacle information, weather information, emergency broadcast information, and/or other information, which may be retrieved from various sources.

The geographic information may also include traffic information, including air traffic information, from the base stations 125A-E and/or other base stations associated with the same mobile network operator, base stations of one or more other mobile network operator, and/or another party. For example, the traffic information may indicate utilization/occupancy associated with different base stations. In this regard, the geographic information controller 1010 may generate control signals to be transmitted via the communication transceiver 1005, and cause traffic information to be received via the communication transceiver 1005. The geographic information may be utilized as is or may be processed into a form more readily usable for facilitating flight plan generation. For example, the traffic information may be, or may be processed to obtain, traffic statistics.

The geographic region identifier 1015 may be utilized to identify a geographic region that encompasses the starting point and the destination point. In some cases, the geographic region identifier may generate a grid (e.g., the grid 500) associated with the geographic region. In this regard, the geographic region identifier 1015 may utilize a map to identify the geographic region and divide the geographic region into blocks that form the grid. Each block may be associated with geographic information.

The flight plan generator 1020 may be utilized to generate flight plans. The flight plans, including flight routes and flight rules, may be generated based on geographic information of the geographic region encompassing the starting point and the destination point and/or information from an operator. The flight plan generator 1020 may receive signals from the geographic information controller 1010 and/or the geographic region identifier 1015. In an aspect, the flight plan generator 1020 may utilize the geographic region identifier 1015 to represent the flight routes and flight rules (e.g., using blocks of the grid).

The flight plan manager 1025 may be utilized to manage flight plans. The flight plan manager 1025 may have access to information pertaining to flight plans currently being effectuated by various UAVs, flight plans that have been completed in the past, and flight plans to be initiated in the future. The flight plan manager 1025 may receive, via the communication transceiver 1005, requests from UAVs for authorization to adjust flight plans. The flight plan manager 1025 may authorize or not authorize the requests, such as based on the geographic information, status of other flight plans currently being effectuated, information of past flight plans, and/or other information. The flight plan manager 1025 may also generate and transmit adjustments to flight plans of the UAVs, such as when a new temporary no-fly zone appears. The adjustments may include changes to the flight routes and/or flight rules. In some cases, the adjustments made may be stored for analysis and usage in generating future flight plans.

The user interface (UI) controller 1030 may be utilized to provide an interface for facilitating providing of user input to generate and manage flight plans. For example, the UI controller 1030 may provide a user interface on a website and/or an application program that accepts user input from an operator. By way of non-limiting example, the user interface may allow the operator to provide information that may be utilized by the flight plan generator 1020 and/or the flight plan manager 1025 to generate flight plans and/or adjust existing flight plans.

In an aspect, the flight plan processing unit 1000, or components thereof, may be included in the user device 120. For example, the user device 120 may generate flight plans based on user input into a user interface, e.g. provided in a website or an application.

While an example manner of implementing the UAV processing unit 900 and flight plan processing unit 1000 are illustrated in FIGS. 9 and 10, respectively, one or more of the components (e.g., elements, processes, and/or devices) illustrated in FIGS. 9 and 10 may be combined, divided, rearranged, omitted, eliminated, and/or implemented in any other way. Further, the various components (e.g., the communication transceiver 905, mobility controller 910, autonomous positioner 915, flight controller 920, flight rule controller 925, communication transceiver 1005, geographic information controller 1010, geographic region identifier 1015, flight plan generator 1020, flight plan manager 1025, and UI controller 1030, and/or, more generally, the UAV processing unit 900 of FIG. 9 and/or the flight plan processing unit 1000 of FIG. 10) may be implemented by hardware, software, firmware, and/or any combination of hardware, software, and/or firmware. Thus, for example, any of these components, and/or, more generally, the UAV processing unit 900 and flight plan processing unit 1000 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the UAV processing unit 900 and flight plan processing unit 1000 may be referred to as UAV processing circuit and flight plan processing circuit, respectively. The components may be referred to as communication transceiver circuit, mobility controller circuit, autonomous positioner circuit, flight controller circuit, flight rule controller circuit, geographic information controller circuit, geographic region identifier circuit, flight plan generator circuit, flight plan manager circuit, and UT controller circuit.

When reading any claims as set forth herein to cover purely software and/or firmware implementations, at least one of the UAV processing unit 900, communication transceiver 905, mobility controller 910, autonomous positioner 915, flight controller 920, flight rule controller 925, communication transceiver 1005, geographic information controller 1010, geographic region identifier 1015, flight plan generator 1020, flight plan manager 1025, and UT controller 1030 is hereby expressly defined to include a tangible computer readable storage device or storage disk such as a memory, digital versatile disk (DVD), compact disk (CD), a Blu-ray Disc™, and/or other storage device/disk storing the software and/or firmware.

Figure 11:
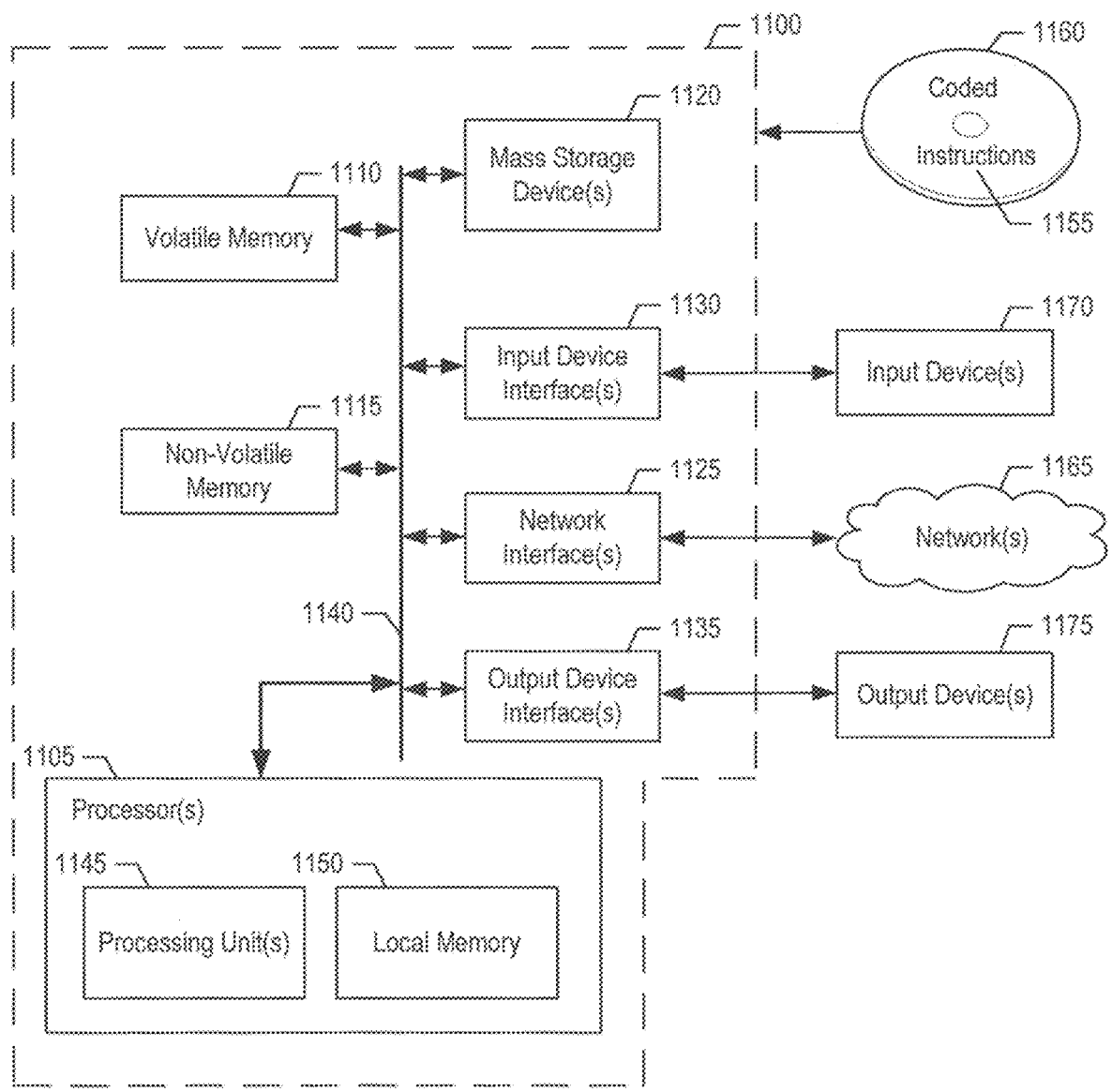
FIG. 11 illustrates a block diagram of an example of an electronic system with which one or more embodiments of the present disclosure may be implemented.

FIG. 11 illustrates a block diagram of an example of an electronic system 1100 with which one or more embodiments of the present disclosure may be implemented. In an embodiment, the electronic system 1100 may be, may include, or may be referred to as, processor platform. The electronic system 1100 can generally be any type of computing device. In an embodiment, the electronic system 1100 can be, can include, and/or can be a part of, one or more of the UAV 105, user device 120, base stations 125A-E, network management system 135, shown in FIG. 1. For example, the electronic system 1100 may be, may include, or may be a part of, the UAV 105.

The electronic system 1100 includes one or more processors 1105, volatile memory 1110, non-volatile memory 1115, one or more mass storage devices 1120, one or more network interfaces 1125, one or more input device interfaces 1130, one or more output device interfaces 1135, and a link 1140. The link 1140 may be, may include, or may be implemented by, a bus, one or more point-to-point connections (e.g., intra-chip connections and/or inter-chip connections), and/or other connections for facilitating connection of and/or communication between various components of the electronic system 1100.

The link 1140 couples (e.g., connects) to the processor(s) 1105. In an aspect, the processor(s) 1105 of the illustrated example is hardware. For example, the processor(s) 1105 can be implemented by one or more integrated circuits, logic circuits, processors, and/or controllers from any desired family or manufacturer. The processor(s) 1105 includes one or more processing units 1145 configured via instructions 1155 stored in a local memory 1150 (e.g., a cache) of the processor(s) 1105. In an aspect, for a UAV (e.g., the UAV 105), the instructions 1155 may include instructions that when executed, perform the instructions of FIGS. 2, 3, and 6, to implement the UAV processing unit 900, mobility controller 910, autonomous positioner 915, flight controller 920, and/or flight rule controller 925 of FIG. 9 and/or to implement the flight plan processing unit 1000, geographic information controller 1010, geographic region identifier 1015, flight plan generator 1020, flight plan manager 1025, and/or UI controller 1030 of FIG. 10. The processor(s) 1105 is in communication with the volatile memory 1110, non-volatile memory 1115, and the mass storage device(s) 1120 via the link 1140. In an aspect, the processor(s) 1105 may be, may include, or may be a part of, the UAV processing unit 900 of FIG. 9 or the flight plan processing unit 1000 of FIG. 10. In an aspect, the processing units 1145 may be, may include, or may be a part of, the UAV processing unit 900 of FIG. 9 or the flight plan processing unit 1000 of FIG. 10.

The link 1140 couples (e.g., connects) to the volatile memory 1110, non-volatile memory 1115, and mass storage device(s) 1120. The volatile memory 1110 may include synchronous dynamic random access memory (SDRAM), dynamic RAM (DRAM), static RAM (SRAM) Rambus dynamic RAM (RDRAM), and/or other types of volatile memory. The non-volatile memory 1115 may include read-only memory (ROM), programmable ROM (PROM), erasable programmable ROM (EPROM), electrically erasable programmable (EEPROM), flash memory, non-volatile RAM (NVRAM), and/or other types of non-volatile memory. The non-volatile memory 1115 may store instructions and data even when the electronic system 1100 is off. The mass storage device(s) 1120 may include floppy disk drives, hard disk drives, compact disk drives, DVD drives, Blu-ray Disc™ drives, redundant array of independent disks (RAID) systems, solid state memories, and/or other devices that allow storage. Access to the volatile memory 1110, non-volatile memory 1115, and mass storage device(s) 1120 may be controlled by a memory controller (not shown). In an aspect, the coded instructions 1155 corresponding to the instructions of FIGS. 2, 3, and/or 6 may be stored in the volatile memory 1110, non-volatile memory 1115, mass storage device(s) 1120, local memory 1150, and/or on a removable tangible computer readable storage medium, such as a disk 1160 (e.g., CD, DVD, or Blu-ray Disc™).

The link 1140 couples (e.g., connects) to the network interface(s) 1125. The network interface(s) 1125 may couple the electronic system 1100 to one or more networks 1165. In this manner, the electronic system 1100 can be a part of a network of devices, such as a local area network (LAN), a WAN, or an Intranet, or a network of networks, such as the Internet. In an embodiment, the network interface(s) 1125 may facilitate communication between the electronic system 1100 and a cellular network, such as a cellular network that includes the base stations 125A-E and network management system 135 of FIG. 1. In this regard, the network interface(s) 1125 may also facilitate communication between the electronic system 1100 and the user device 120. The network interface(s) 1125 may be implemented by any type of interface standard, such as an Ethernet interface, a universal serial bus (USB) interface, a PCI express interface, a wireless network interface (e.g., wireless LAN interface), a cellular network interface, and/or other interfaces. For example, a cellular network interface may provide support for Global System for Mobile Communications (GSM)-based cellular networks, code division multiple access (CDMA)-based cellular networks, and/or other cellular networks. The network interface(s) 1125 may include a communication device such as a transmitter, receiver, transceiver, modem, and/or network interface card to facilitate exchange of data with external machines (e.g., computing devices of any kind) via the network(s) 1165. In an aspect, the network interface(s) 1125 may be structured to implement the communication transceiver 905 of FIG. 9 or the communication transceiver 1005 of FIG. 10.

The link 1140 couples (e.g., connects) to the input device interface(s) 1130. The input device interface(s) 1130 may couple the electronic system 1100 to one or more input devices 1170. The input device(s) 1170 may enable a user to provide (e.g., enter) data and commands to the electronic system 1100. For example, the user may be an operator of the UAV 105 when the electronic system 1100 is disposed on the UAV 105 or when the electronic system 1100 is a remote control device (e.g., the user device 120) of the UAV 105. The input device(s) 1170 may include, for example, an audio sensor, a microphone, a camera (still or video), a voice recognition system, a keyboard (e.g., a physical or virtual keyboard), a cursor control device (e.g., a mouse), a touch-screen, and/or other devices for providing user input to the electronic system 1100. Also, many systems, such as the electronic system 1100, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust a flight path of a UAV (e.g., the UAV 105) that is, includes, or is a part of the electronic system 1100, the user may enter text via a physical keyboard communicatively connected to the electronic system 1100 via the input device interface(s) 1130. The text input may be relayed to the processor(s) 1105 via the input device interface(s) 1130 and the link 1140. The processor(s) 1105 may process the text input into commands to adjust the flight path of the UAV and facilitate implementation of the commands.

The link 1140 couples (e.g., connects) to the output device interface(s) 1135. The output device interface(s) 1135 may couple the electronic system 1100 to one or more output devices 1175. The output device interface(s) 1135 may include a graphics and/or audio driver card, graphics and/or audio driver chip, and/or graphics and/or audio driver processor. The output device(s) 1175 may enable the electronic system 1100 to provide output information to a user. The output device(s) 1175 may include, for example, display devices (e.g., a light emitting diode (LED), an organic LED (OLED), a liquid crystal display (LCD)), audio devices (e.g., speakers), audiovisual devices, and/or other output devices. In this regard, the output information may provide feedback to the user in any form, such as visual feedback, auditory feedback, and/or tactile feedback. For example, in an aspect, a UAV (e.g., the UAV 105) that is, includes, or is a part of the electronic system 1100 may provide operational characteristics, such as remaining battery power, remaining fuel level, remaining actions to be performed, current position in a flight path, component health (e.g., engine health, battery health), to a display coupled to the UAV (e.g., wired or wirelessly coupled) via the output device interface(s) 1135 and viewable by the user.

In one or more embodiments, FIGS. 2, 3, and 6 illustrate example machine readable instructions for implementing the UAV 105, UAV processing unit 900 and/or components thereof, and/or flight plan processing unit 1000 and/or components thereof. In these examples, the machine readable instructions may include one or more programs for execution by one or more processors, such as the processor (s) 1105 shown in the electronic system 1100. The one or more programs, or portion(s) thereof, may be embodied in software stored on a tangible computer readable storage medium, such as a CD-ROM, a floppy disk, a hard drive, a DVD, a Blu-ray Disc™, and/or a memory associated with the processor(s) 1105, but the entire program or programs and/or portions thereof may alternatively be executed by a device other than the processor(s) 1105, and/or embodied in firmware or dedicated hardware (e.g., implemented by an ASIC, a PLD, an FPLD, discrete logic, etc.). Further, although the example program(s) is described with reference to the flow diagrams illustrated in FIGS. 2, 3, and 6, many other methods may be used. For example, with reference to the flow diagrams illustrated in FIGS. 2, 3, and 6, the order of execution of the blocks may be changed, and/or some of the blocks described may be changed, removed, combined, and/or subdivided into multiple blocks.

The example processes 200, 300, and 600 of FIGS. 2, 3, and 6, respectively, may be implemented using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example processes 200, 300, and 600 of FIGS. 2, 3, and 6, respectively, may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A method comprising:
   receiving, by a device comprising a processor, first geographic information associated with a geographic region, wherein the geographic region is associated with a starting point and a destination point, and wherein the first geographic information comprises at least one of obstacle information, weather information, traffic information, or emergency broadcast information;
   navigating the device from the starting point to the destination point based at least in part on the first geographic information; and
   maintaining connectivity of the device to a cellular network during the navigating by connecting, for each portion of a flight route from the starting point to the destination point, the device to a respective base station of the cellular network, wherein a flight of the device via the flight route is based at least in part on a priority level associated with a block of a group of blocks in a grid encompassing the flight route.

2. The method of claim 1, further comprising receiving, by the device, flight plan information comprising the flight route and a listing of base stations, wherein the maintaining comprises connecting, for each portion of the flight route, the device to a respective base station on the listing of base stations.

3. The method of claim 2, further comprising:
   receiving, by the device, an indication of a change in the first geographic information, wherein the indication is based at least in part on updated geographic information received by the device from at least one base station of the cellular network; and
   deviating, by the device, from the flight route based at least in part on the indication.

4. The method of claim 3, further comprising:
   transmitting, by the device, a request to deviate from the flight route; and
   receiving, by the device, an authorization to deviate from the flight route, wherein the deviating is in response to the authorization.

5. The method of claim 1, wherein at least a portion of the first geographic information is received, by the device, as part of a broadcast message from a base station of the cellular network, and wherein the broadcast message comprises a master information block message or a system information block message.

6. The method of claim 1, further comprising determining, by the device, second geographic information based at least in part on sensor data acquired by a sensor of the device and the second geographic information.

7. The method of claim 1, wherein the maintaining comprises:
   selecting a first base station of the cellular network from among a group of base stations of the cellular network based at least in part on the priority level; and
   connecting, by the device, the device to the first base station in response to the selecting.

8. The method of claim 7, wherein the maintaining further comprises:
   determining, based at least in part on the first geographic information, a transition point between the first base station and a second base station of the cellular network; and
   transitioning a connection from the first base station to the second base station when the transition point has been reached.

9. The method of claim 8, wherein the transitioning comprises transitioning a directional antenna of the device from pointing at the first base station to pointing at the second base station, and wherein the first geographic information comprises position information associated with the first base station and the second base station.

10. A device, comprising:
    one or more processors; and
    a non-transitory machine readable medium comprising instructions stored therein, which when executed by the one or more processors, cause the one or more processors to perform operations, wherein the operations comprise:
       receiving information indicative of a route, a listing of base stations along the route, and first geographic information associated with the route, wherein the first geographic information comprises at least one of obstacle information, weather information, traffic information, or emergency broadcast information;
       navigating over the route based at least in part on the first geographic information and the listing of base stations, wherein the navigating is based on a priority level associated with at least one of a group of blocks represented in a grid comprising the route;
       connecting, for each portion of the route, the device to a respective base station included in the listing of base stations; and
       maintaining, based on the connecting, connectivity of the device to network equipment during the navigating.

11. The device of claim 10, wherein the operations further comprise determining second geographic information based on sensor data acquired by a sensor of the device, and wherein the navigating is further based on the second geographic information.

12. The device of claim 10, wherein at least one base station included in the listing of base stations is associated with the priority level.

13. The device of claim 10, wherein the operations further comprise:
    transmitting a request to adjust the route based on data detected by a sensor of the device;
    receiving an authorization to adjust the route based on the request; and
    adjusting the route in response to receiving the authorization.

14. The device of claim 10, wherein the operations further comprise:
    configuring the device not to connect to base stations that are not included in the listing of base stations; and
    determining that a base station is not included in the listing of base stations based on an identifier contained in a signal received from the base station.

15. A non-transitory machine readable storage medium including machine readable instructions which, when executed, cause one or more processors of a drone to perform operations, wherein the operations comprise:
    receiving flight plan information comprising a flight route and a listing of base stations along the flight route;
    navigating the drone over the flight route based at least in part on geographic information associated with a geographic region, wherein the geographic region is associated with the flight route, and wherein the geographic information comprises at least one of obstacle information, weather information, traffic information, or emergency broadcast information, wherein the navigating is based at least in part on a priority level associated with at least one of a plurality of blocks of a grid representing the flight route; and
    during the navigating:
       connecting to a first base station on the listing of base stations;
       determining a transition point between the first base station and a second base station on the listing of base stations; and
       transitioning a connection of the drone from the first base station to the second base station when or after the transition point has been reached.

16. The non-transitory machine readable storage medium of claim 15, wherein a first portion of the geographic information is received by the drone as part of a broadcast message from the first base station, and wherein a second portion of the geographic information is from sensor data acquired by a sensor of the drone.

17. The non-transitory machine readable storage medium of claim 15, wherein at least one base station on the listing of base stations is associated with the priority level.

18. The non-transitory machine readable storage medium of claim 15, wherein the operations further comprise:
    receiving an indication of a change in the geographic information, wherein the indication is based at least in part on updated geographic information received from at least one of the base stations; and
    deviating from the flight route based at least in part on the indication.

19. The non-transitory machine readable storage medium of claim 18, wherein the operations further comprise:
    transmitting a request to deviate from the flight route; and
    receiving an authorization to deviate from the flight route, wherein the deviating is in response to the authorization.

20. The non-transitory machine readable storage medium of claim 15, wherein at least a portion of the geographic information is received as part of a broadcast message from a base station of the base stations, and wherein the broadcast message comprises a master information block message or a system information block message.

\* \* \* \* \*